(12) United States Patent
Huang et al.

(10) Patent No.: US 12,407,456 B2
(45) Date of Patent: *Sep. 2, 2025

(54) COMMUNICATION APPARATUS AND COMMUNICATION METHOD

(71) Applicant: Panasonic Intellectual Property Corporation of America, Torrance, CA (US)

(72) Inventors: Lei Huang, Singapore (SG); Rojan Chitrakar, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,223

(22) Filed: Aug. 31, 2023

(65) Prior Publication Data

US 2023/0421317 A1    Dec. 28, 2023

Related U.S. Application Data

(63) Continuation of application No. 17/339,756, filed on Jun. 4, 2021, now Pat. No. 11,784,767, which is a
(Continued)

(30) Foreign Application Priority Data

Jul. 22, 2016    (JP) ................................. 2016-144910

(51) Int. Cl.
*H04L 5/00*        (2006.01)
*H04W 28/06*       (2009.01)
*H04B 7/0452*      (2017.01)

(52) U.S. Cl.
CPC .......... *H04L 5/0037* (2013.01); *H04L 5/0023* (2013.01); *H04L 5/0094* (2013.01); *H04W 28/06* (2013.01); *H04B 7/0452* (2013.01)

(58) Field of Classification Search
CPC ..... H04B 7/0452; H04L 5/001; H04L 5/0023; H04L 5/0037; H04L 5/0053;
(Continued)

(56) References Cited

U.S. PATENT DOCUMENTS 10,219,271 B1    2/2019    Hedayat et al.
2011/0002309 A1*  1/2011    Park ...................... H04L 1/1607
                                                          370/335
(Continued)

FOREIGN PATENT DOCUMENTS

CN    105376859 A    3/2016
JP    2015136112 A   7/2015
(Continued)

OTHER PUBLICATIONS

IEEE 802.11-15/0132r15, "Specification Framework for TGax", Jan. 28, 2016.
(Continued)

*Primary Examiner* — Stephen J Clawson
(74) *Attorney, Agent, or Firm* — Seed Intellectual Property Law Group LLP

(57) ABSTRACT

A communication apparatus includes circuitry configured to generate an uplink (UL) single-user (SU) partial bandwidth transmission packet using a first format that contains a first preamble and a data field, wherein the first preamble includes a high efficiency signaling B (HE-SIG-B) field containing resource unit (RU) allocation information indicating one of a plurality of RU arrangements and includes a plurality of user fields; and a transmitter configured to transmit the UL SU partial bandwidth transmission packet to
(Continued)

an access point (AP). The one of the plurality of RU arrangements indicates a plurality of RUs which respectively correspond to the plurality of user fields, and one RU of the plurality of RUs is an RU allocated to the AP and other RU(s) of the plurality of RUs are RU(s) unallocated to the AP. The first format is also used for a downlink (DL) multi-user (MU) transmission.

12 Claims, 16 Drawing Sheets

Related U.S. Application Data continuation of application No. 16/306,402, filed as application No. PCT/JP2017/024288 on Jul. 3, 2017, now Pat. No. 11,057,172.

(58) Field of Classification Search
CPC ............................ H04L 5/0094; H04W 28/06; H04W 72/1289; H04W 84/12
See application file for complete search history.

(56) References Cited

U.S. PATENT DOCUMENTS

| | | | |
|---|---|---|---|
| 2015/0063332 A1* | 3/2015 | Lee | ...................... H04W 16/14 370/338 |
| 2015/0207599 A1 | 7/2015 | Kim et al. | |
| 2016/0100396 A1 | 4/2016 | Seok | |
| 2016/0119927 A1 | 4/2016 | Hedayat | |
| 2016/0150505 A1 | 5/2016 | Hedayat | |
| 2016/0219591 A1* | 7/2016 | Lee | ...................... H04W 40/244 |
| 2016/0353322 A1* | 12/2016 | Li | .......................... H04L 5/0023 |
| 2016/0366701 A1 | 12/2016 | Chu et al. | |
| 2017/0026151 A1 | 1/2017 | Adachi | |
| 2017/0041929 A1 | 2/2017 | Noh et al. | |
| 2017/0094664 A1* | 3/2017 | Lee | ...................... H04L 5/0028 |
| 2017/0230952 A1 | 8/2017 | Choi et al. | |
| 2017/0279570 A1 | 9/2017 | Kim et al. | |
| 2018/0302858 A1 | 10/2018 | Son et al. | |
| 2018/0316467 A1 | 11/2018 | Zhu et al. | |
| 2019/0053275 A1 | 2/2019 | Lanante et al. | |
| 2020/0396742 A1* | 12/2020 | Park | ...................... H04W 76/11 |

FOREIGN PATENT DOCUMENTS

| | | |
|---|---|---|
| WO | WO 2016021941 A1 | 2/2016 |
| WO | WO 2016028125 A2 | 2/2016 |

OTHER PUBLICATIONS

IEEE 802.11-15/0574r0, "SIG Structure for UL PPDU", May 11, 2015.
IEEE 802.11-15/0805r2, "SIG-B Field for HEW PPDU", Jul. 13, 2015.
Josiam et al., "HE-SIG-B Contents," IEEE 802.11-15/1066r0, Sep. 13, 2015. (25 pages).
IEEE 802.11-16/0024r0, "Proposed TGax draft Specification", Jan. 17, 2016.
IEEE 802.11-16/0613r1, "HE-SIG-B Related Issues", May 15, 2016.
IEEE Std 802.11ac(TM)-2013, "IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," Dec. 11, 2013. (425 pages).
International Search Report of PCT application No. PCT/JP2017/024288 dated Sep. 19, 2017.
Kim et al., "HE-SIG-B Structure," IEEE 802.11-15/0821r2, Jul. 15, 2015, 19 pages.
Liu et al., "HE-SIG-B Contents," IEEE 802.11-15/1335r2, Nov. 10, 2015, 23 pages.
Porat et al., "SIG-B Encoding Structure," IEEE 802.11-15/0873R0, Jul. 13, 2015, 13 pages.
Zhang et al., "Left over Issues in RA Signaling for HE-SIGB," IEEE 802.11-16/0063r0, May 16, 2016, 19 pages.
IEEE 802.11-15/0132r9, "Specification Framework for TGax," Sep. 22, 2015, 22 pages.
IEEE 802.11-15/0132r17, "Specification Framework for TGax," May 25, 2016, 61 pages.

* cited by examiner

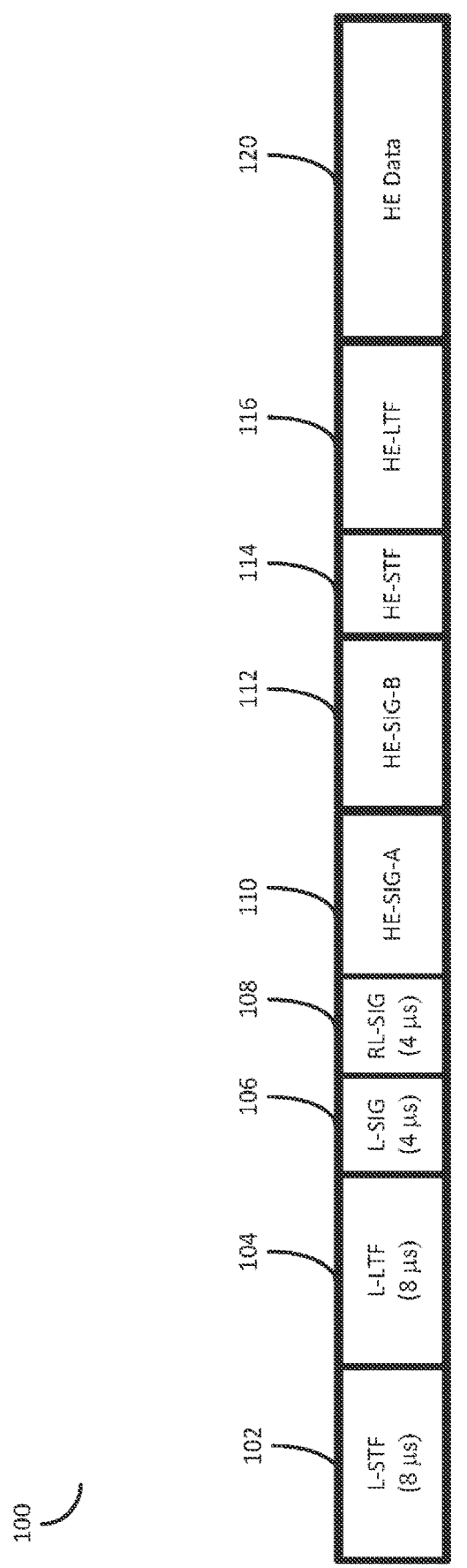
[Fig. 1]

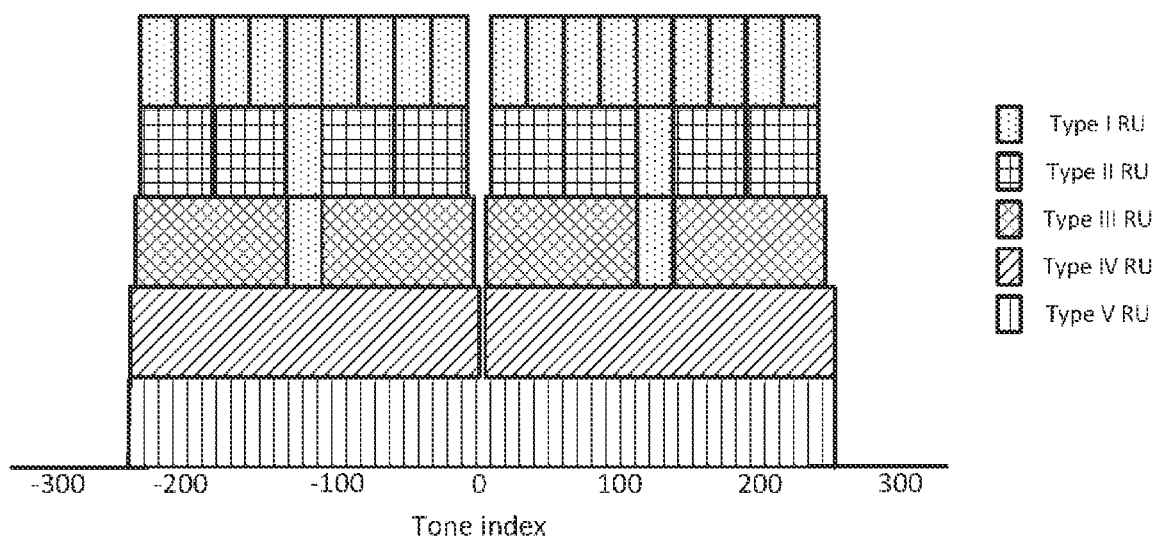
[Fig. 2]

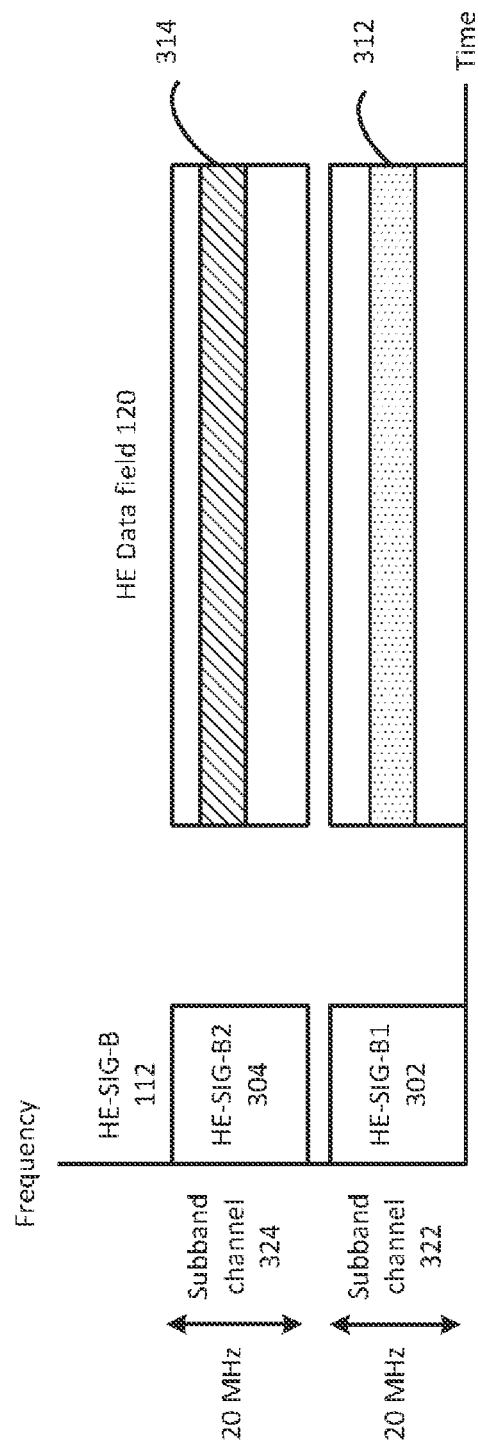
[Fig. 3]

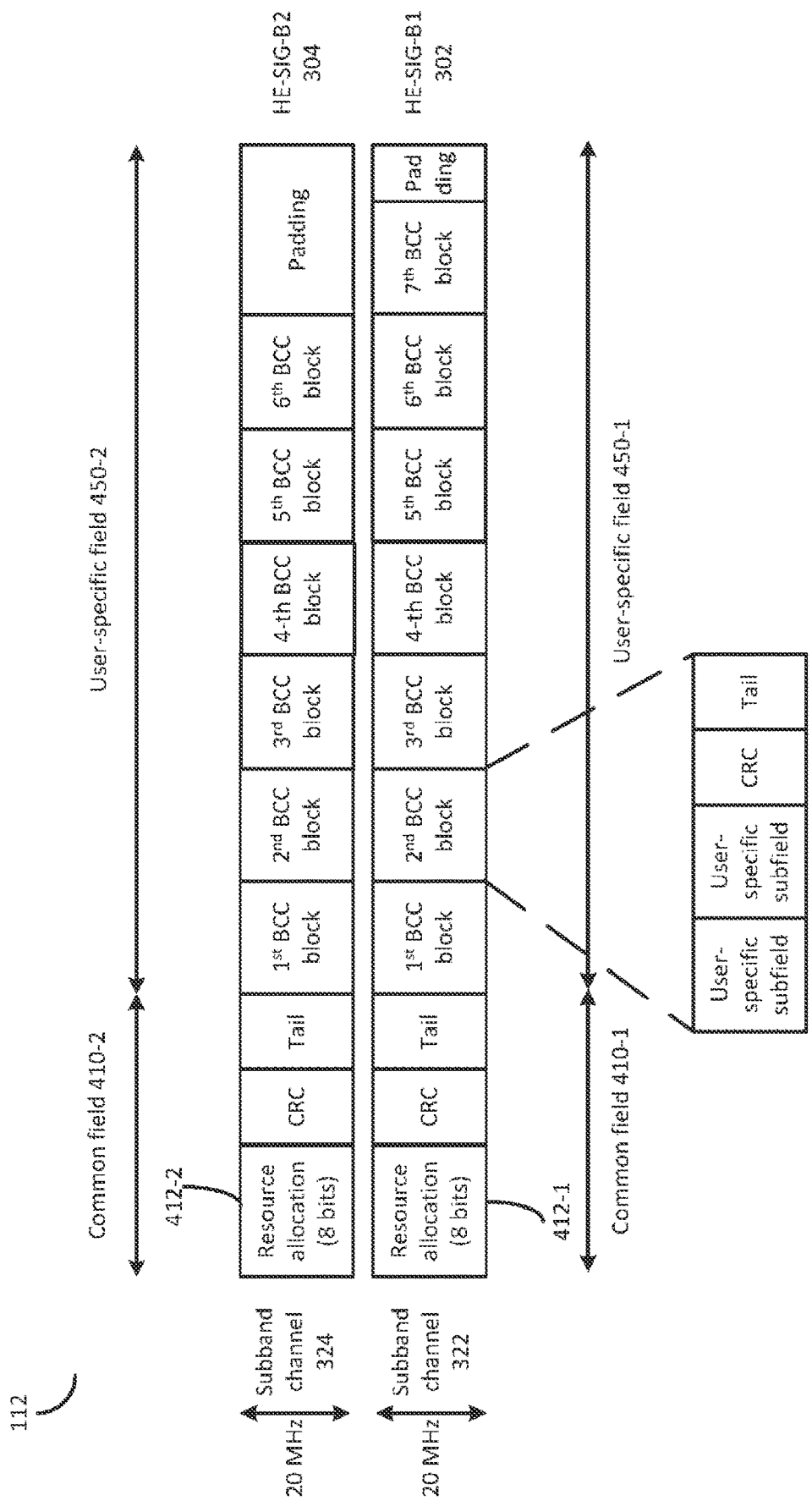
[Fig. 4]

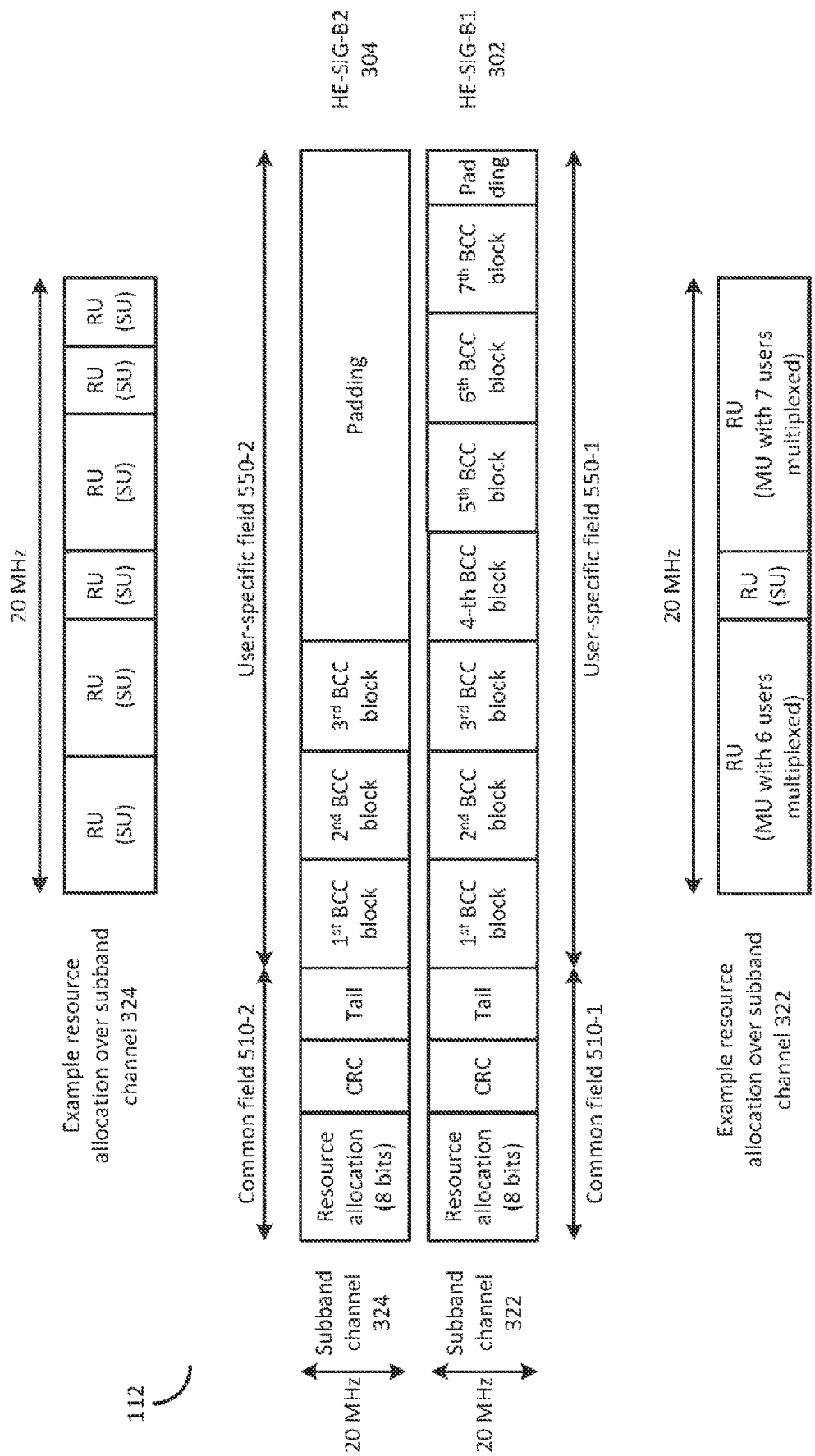
[Fig. 5]

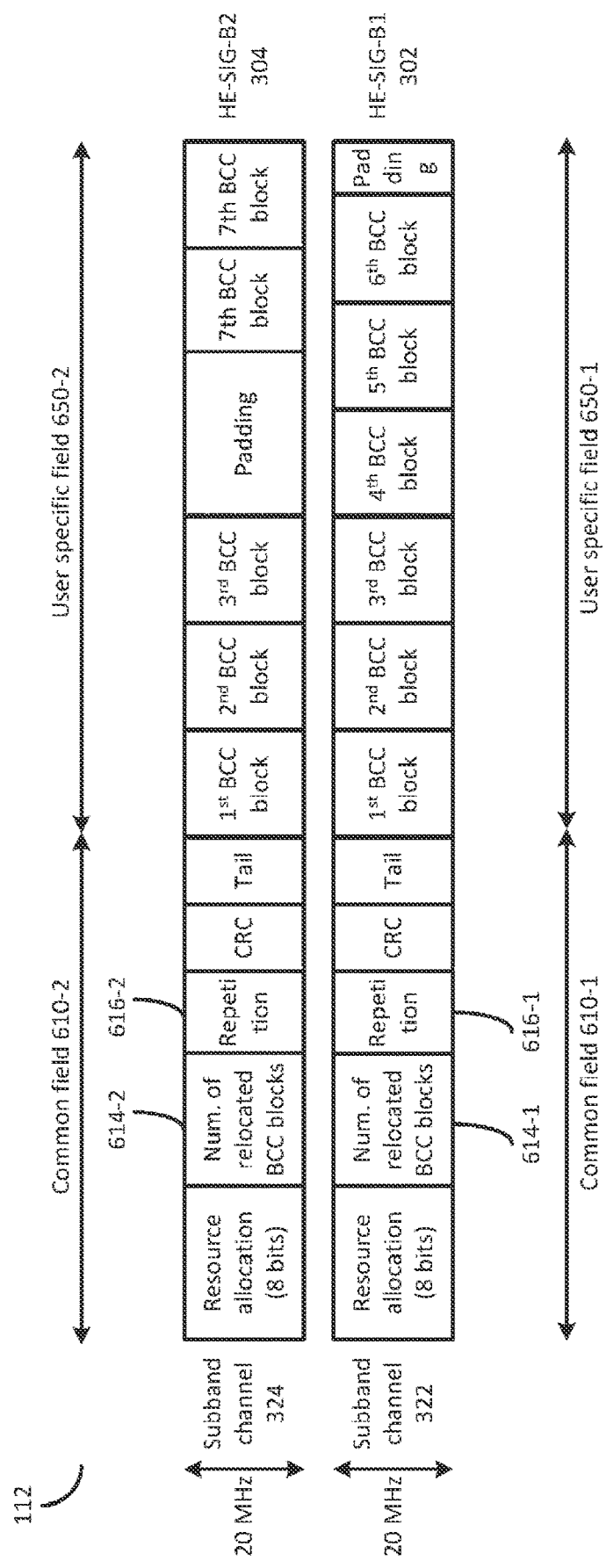
[Fig. 6]

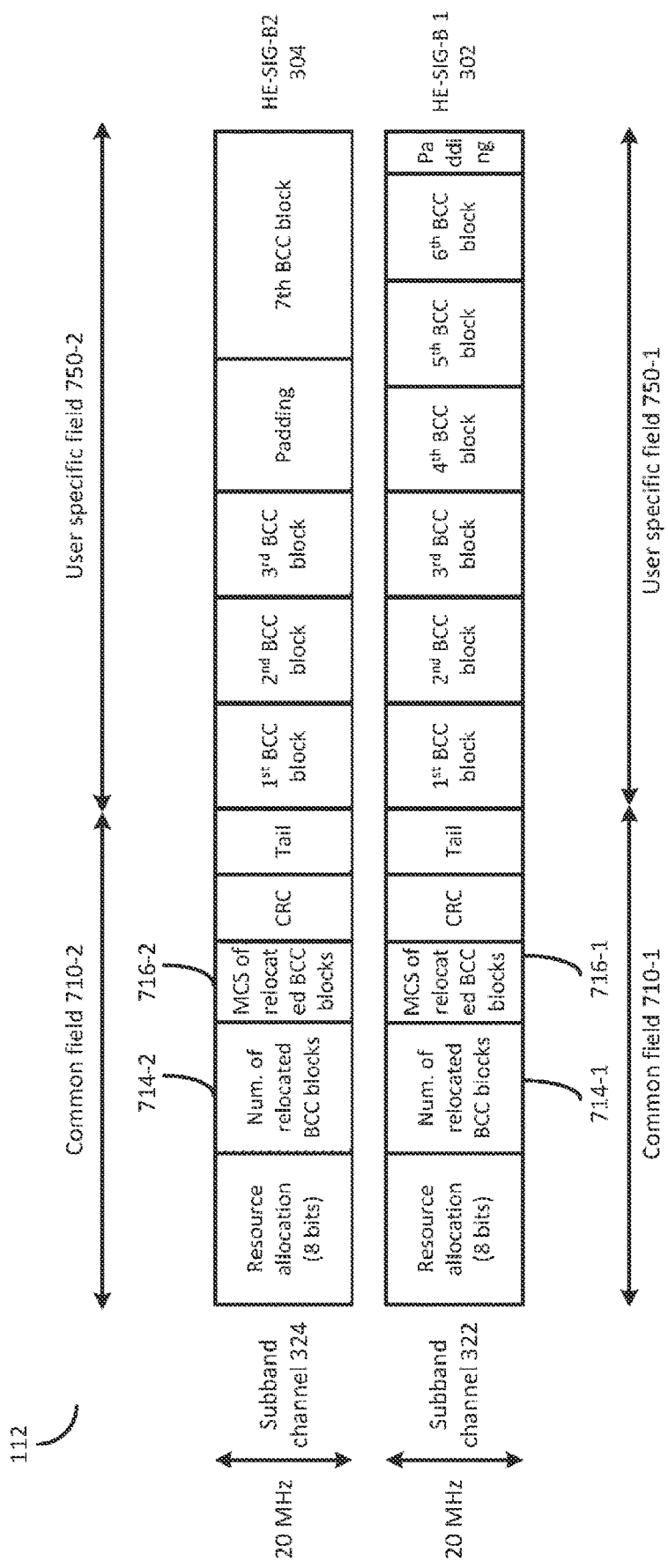
[Fig. 7]

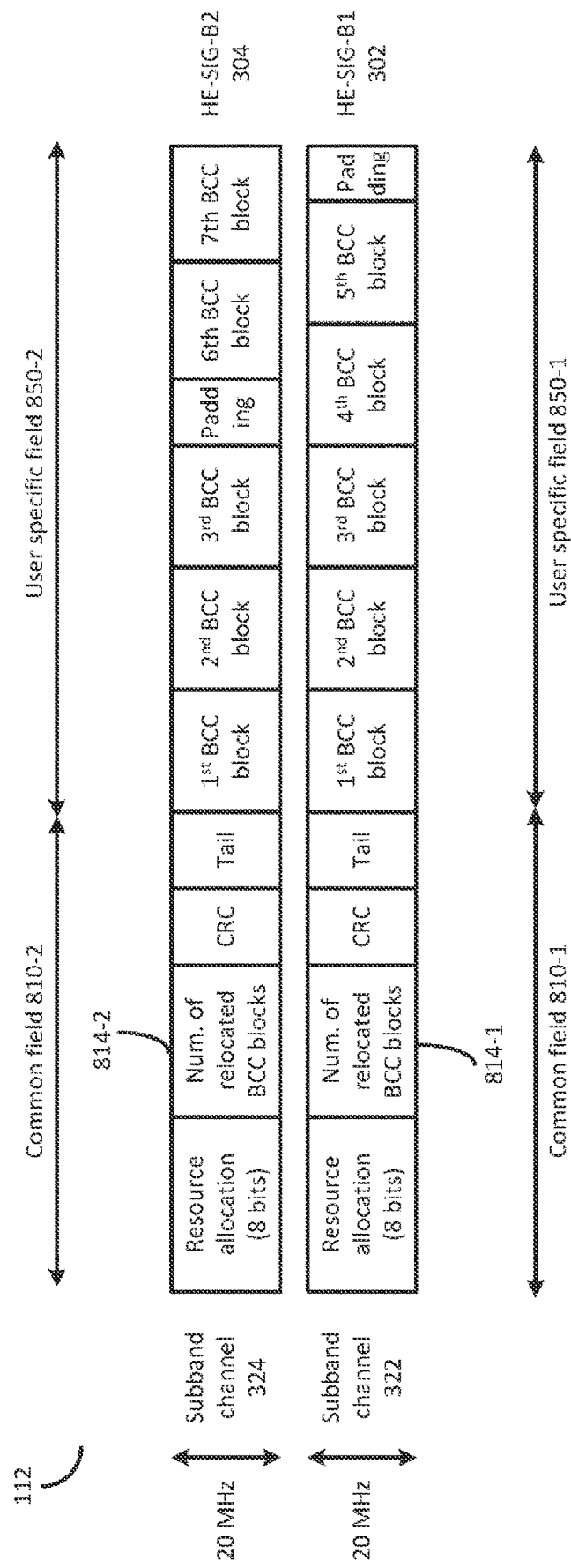
[Fig. 8]

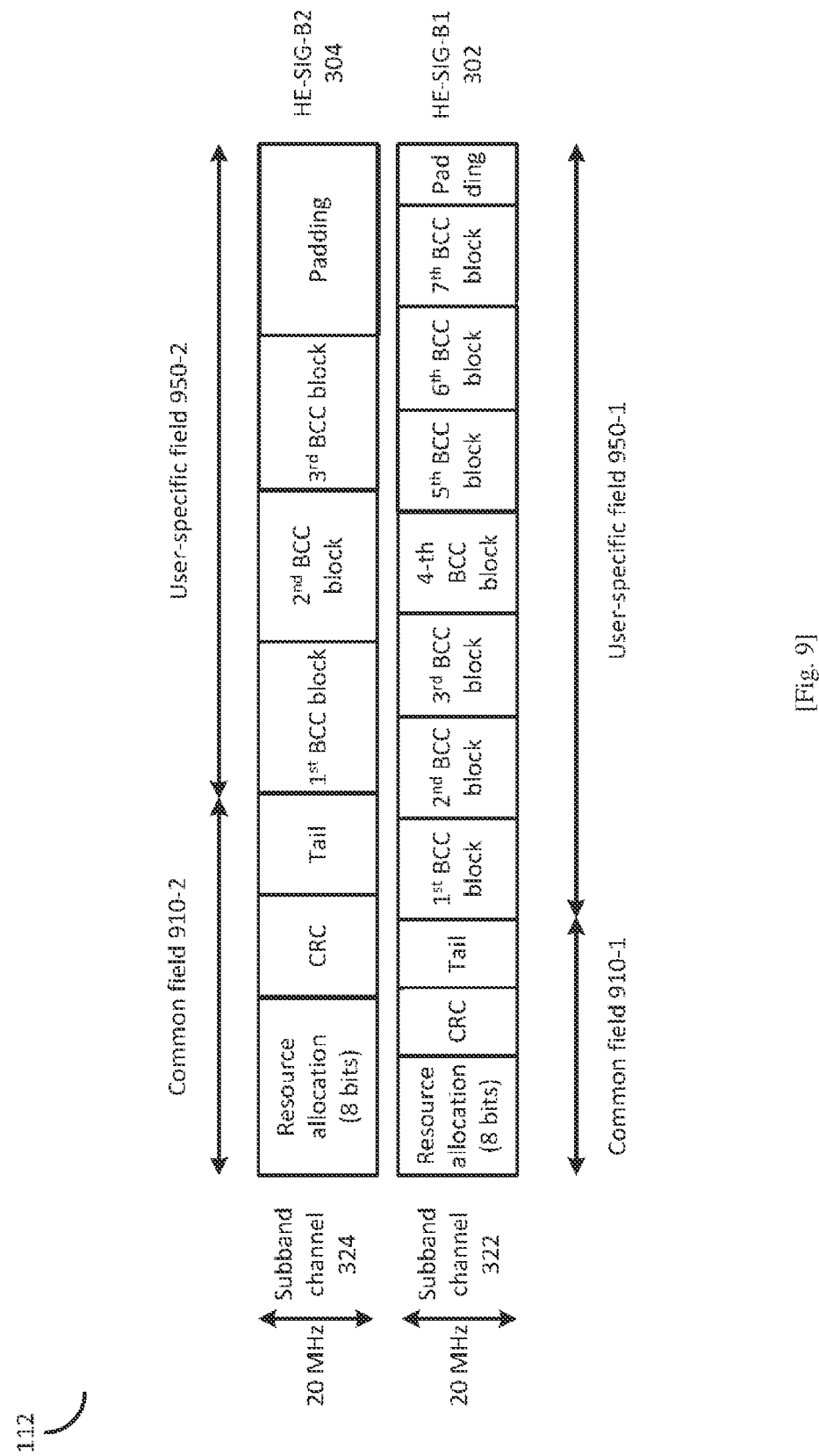
[Fig. 9]

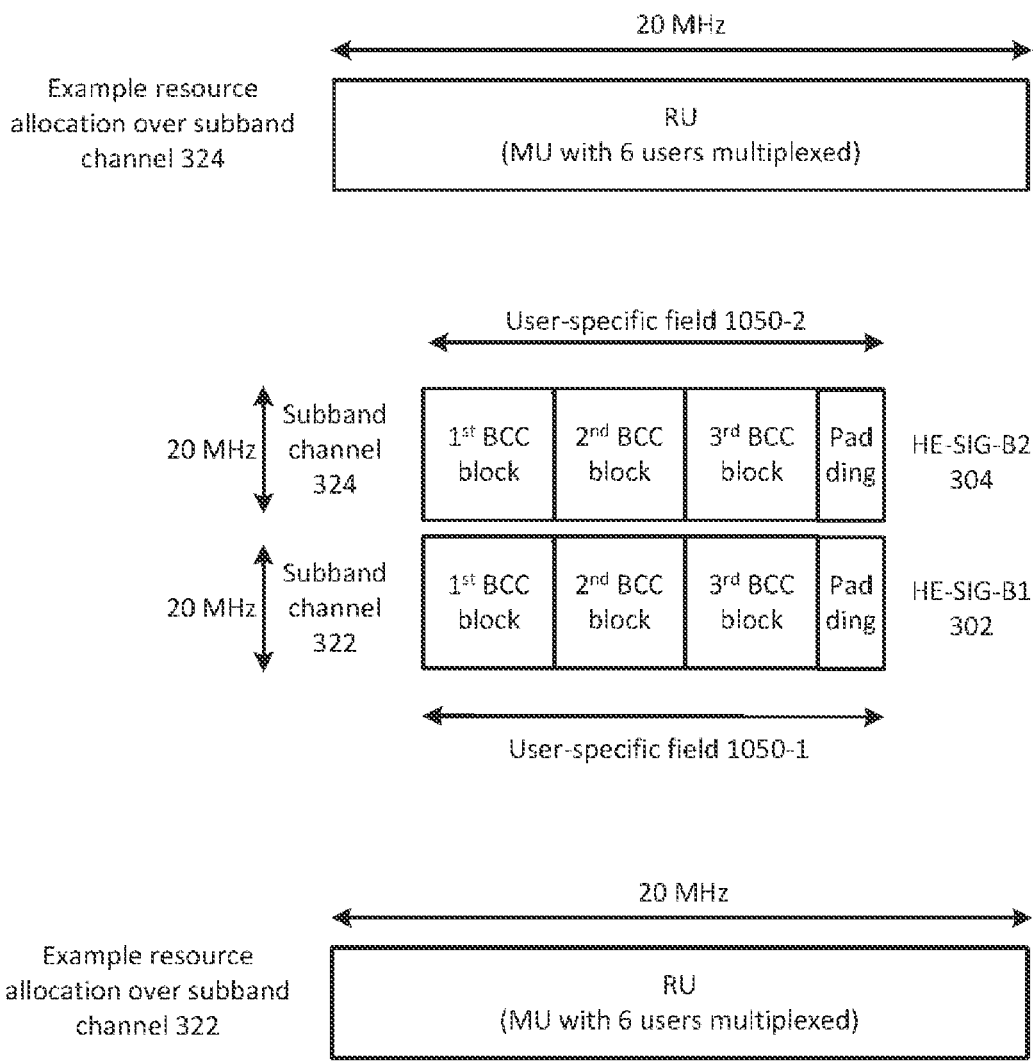
[Fig. 10]

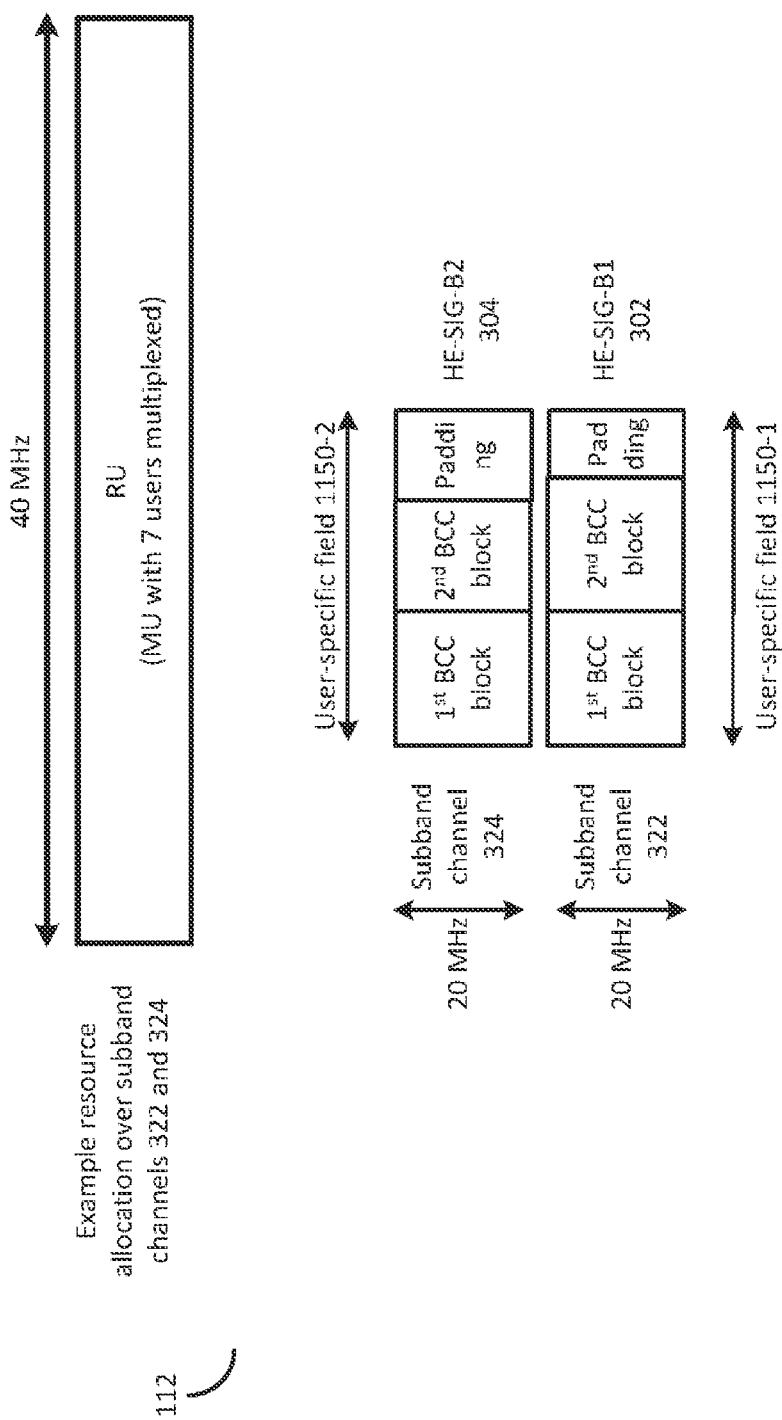
[Fig. 11]

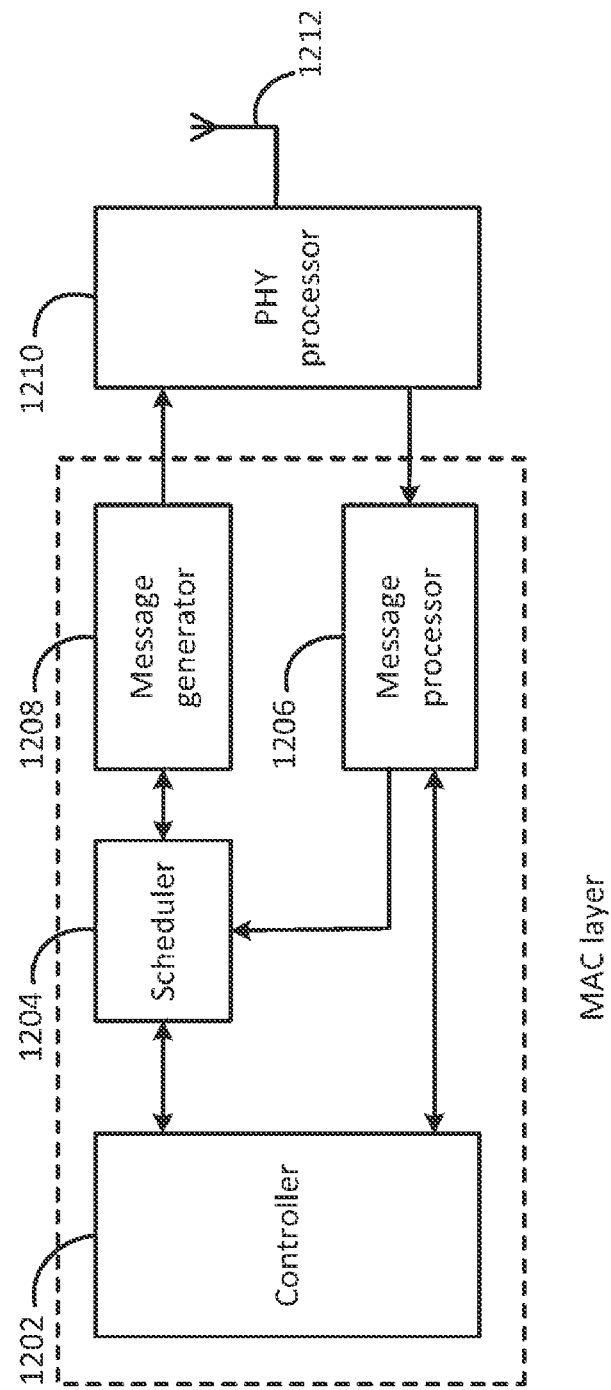
[Fig. 12]

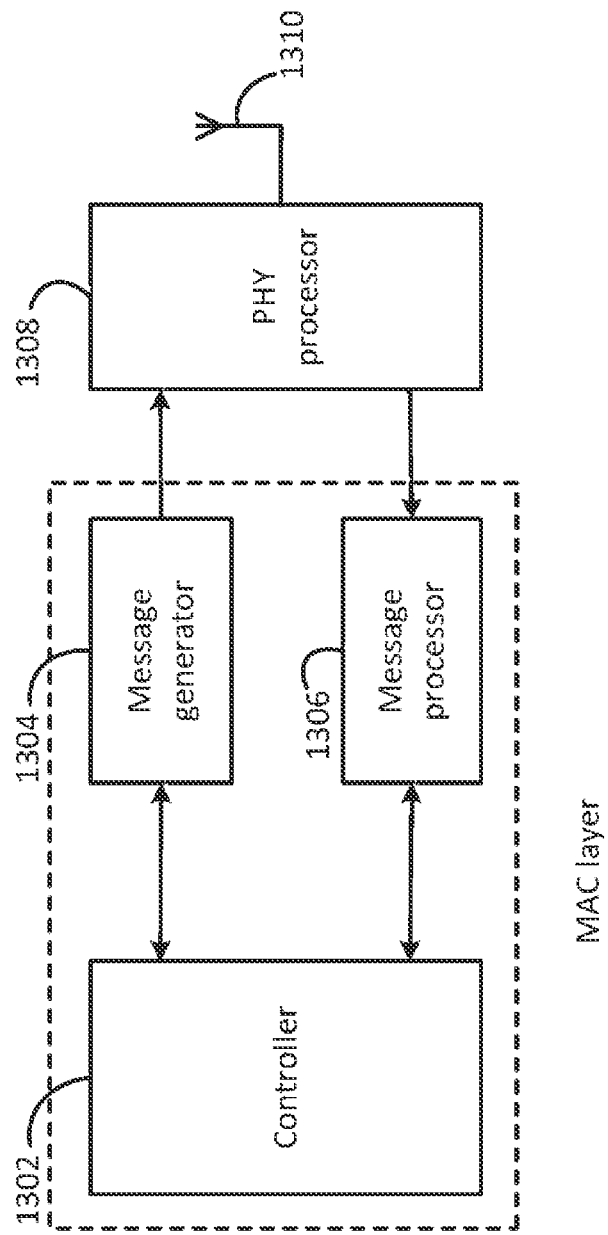
[Fig. 13]

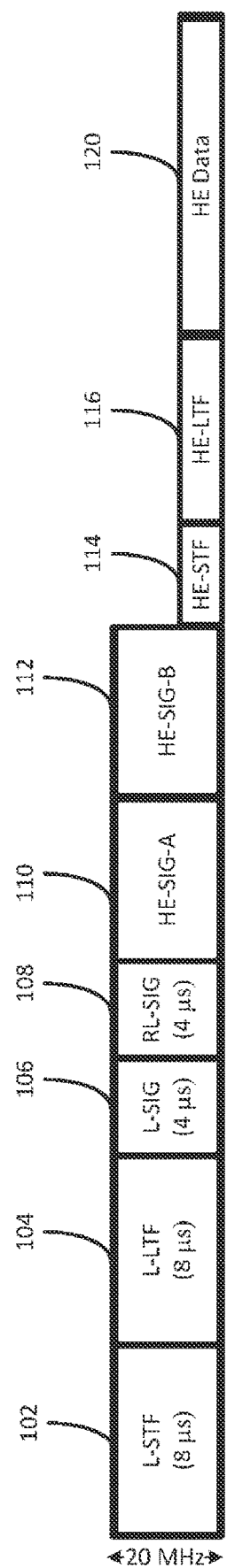
[Fig. 14]

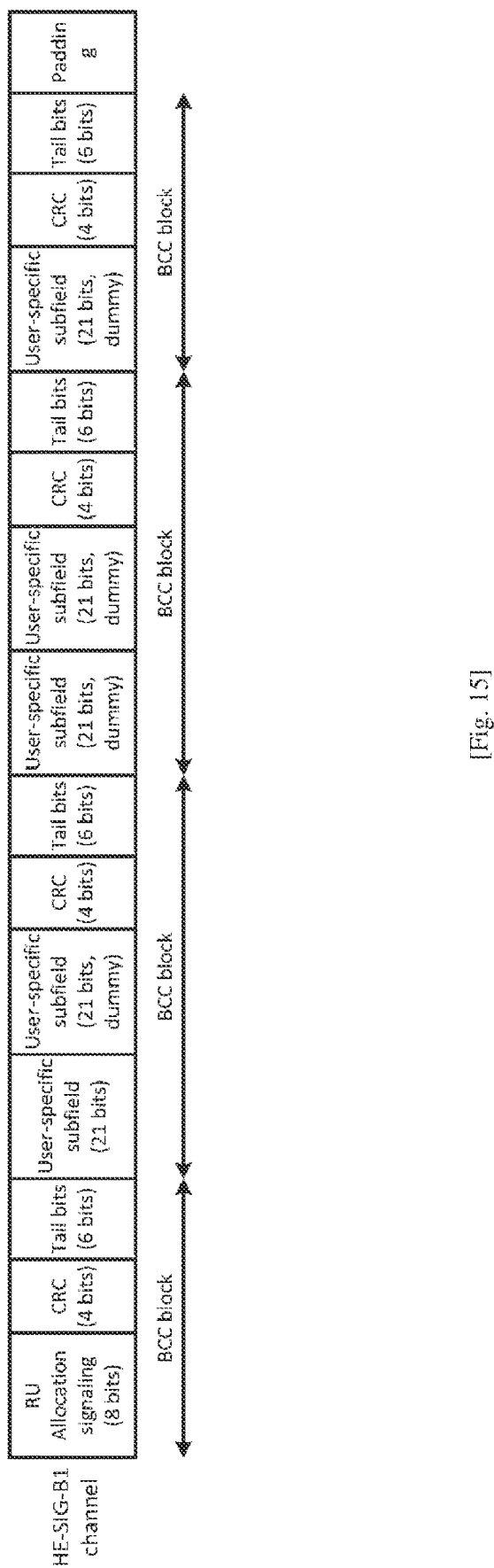
[Fig. 15]

[Fig. 16]
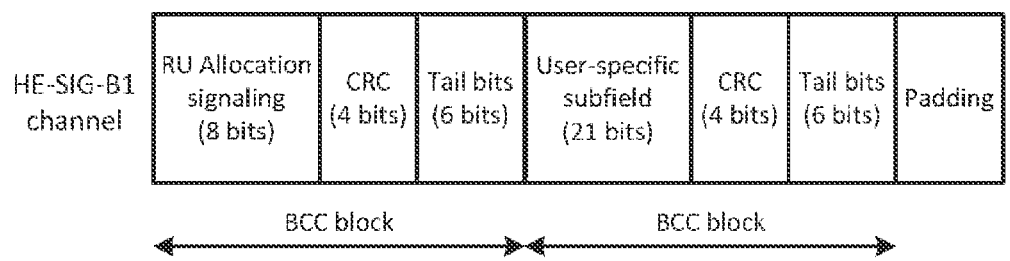

COMMUNICATION APPARATUS AND COMMUNICATION METHOD

BACKGROUND

Technical Field

The present disclosure generally pertains to wireless communications and, more particularly, to a transmission apparatus and a transmission method for transmitting control signaling in a wireless communications system.

Description of the Related Art

The IEEE (Institute of Electrical and Electronics Engineers) 802.11 Working Group is developing 802.11ax HE (High Efficiency) WLAN (Wireless Local Area Network) air interface in order to achieve a very substantial increase in the real-world throughput achieved by users in high density scenarios. OFDMA (Orthogonal Frequency Division Multiple Access) multiuser transmission has been envisioned as one of the most important features in 802.11ax. OFDMA is a multiple access scheme that performs multiple operations of data streams to and from the plurality of users over the time and frequency resources of the OFDM system.

Studies are underway to perform frequency scheduling for OFDMA multiuser transmission in 802.11ax. According to frequency scheduling, a radio communication access point apparatus (hereinafter simply "access point" or "AP") adaptively assigns subcarriers to a plurality of radio communication station apparatuses (hereinafter simply "terminal stations" or "STAs") based on reception qualities of frequency bands of the STAs. This makes it possible to obtain a maximum multiuser diversity effect and to perform communication quite efficiently.

Frequency scheduling is generally performed based on a Resource Unit (RU). A RU comprises a plurality of consecutive subcarriers. The RUs are assigned by an AP to each of a plurality of STAs with which the AP communicates. The resource assignment result of frequency scheduling performed by the AP shall be reported to the STAs as resource assignment information. In addition, the AP shall also report other control signaling such as common control information and per-user allocation information to the STAs.

CITATION LIST

Non Patent Literature

[NPL 1] IEEE802.11-15/0132r9, Specification Framework for TGax, September 2015
[NPL 2] IEEE802.11-15/1066r0, HE-SIG-B Contents, September 2015
[NPL 3] IEEE Std 802.11ac-2013
[NPL 4] IEEE802.11-15/0132r15, Specification Framework for TGax, January 2016
[NPL 5] IEEE802.11-16/0024r0, Proposed TGax Draft Specification, January 2016
[NPL 6] IEEE802.11-15/0132r17, Specification Framework for TGax, May 2016
[NPL 7] IEEE802.11-15/0574r0, SIG Structure for UL PPDU, May 2015
[NPL 8] IEEE802.11-16/0613r1, HE-SIG-B Related Issues, May 2016
[NPL 9] IEEE802.11-15/0805r2, SIG-B Field for HEW PPDU, July 2015

BRIEF SUMMARY

As flexibility in frequency scheduling increases, more signaling bits are needed to report control signaling (i.e., common control information, resource assignment information and per-user allocation information) to STAs. This results in an increase of the overhead for reporting control signaling. So there is a relationship of trade-off between flexibility in frequency scheduling and overhead for reporting control signaling. A challenge is how to achieve flexible frequency scheduling while suppressing an increase of the overhead for reporting the control signaling.

In one general aspect, the techniques disclosed here feature: a transmission apparatus comprising a transmission signal generator which, in operation, generates a transmission signal that includes a legacy preamble, a non-legacy preamble and a data field, wherein the non-legacy preamble comprises a first signal field and a second signal field, the second signal field comprising a first channel field for a first subband channel and, when the transmission signal occupies more than one subband channel, the second signal field further comprising a second channel field for a second subband channel different from the first subband channel, each of the first channel field and the second channel field comprising a user-specific field that includes a plurality of user fields, each user field carrying per-user allocation information for corresponding one of one or more terminal stations, and wherein the plurality of user fields are split equitably between the first channel field and the second channel field when a full bandwidth that covers the first subband channel and the second subband channel is allocated for multi-user (MU) MIMO transmission; and a transmitter which, in operation, transmits the generated transmission signal.

It should be noted that general or specific disclosures may be implemented as a system, a method, an integrated circuit, a computer program, a storage medium, or any selective combination thereof.

With the transmission apparatus and transmission method of the present disclosure, it is possible to achieve flexible frequency scheduling while suppressing an increase of the overhead for reporting the control signaling.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 1 shows a diagram illustrating the format of an HE packet complying with the IEEE 802.11ax specification framework document.

FIG. 2 shows a diagram illustrating an example OFDMA structure of the HE data field of the HE packet in case of CBW=40 MHz.

FIG. 3 shows a diagram illustrating an example structure of the HE-SIG-B of the HE packet in case of CBW=40 MHz.

FIG. 4 shows a diagram illustrating an example format of the HE-SIG-B of the HE packet in case of CBW=40 MHz.

FIG. 5 shows a diagram illustrating another example format of the HE-SIG-B of the HE packet in case of CBW=40 MHz.

FIG. 6 shows a diagram illustrating an example format of the HE-SIG-B of the HE packet in case of CBW=40 MHz according to a first embodiment of the present disclosure.

FIG. 7 shows a diagram illustrating an example format of the HE-SIG-B of the HE packet in case of CBW=40 MHz according to a second embodiment of the present disclosure.

FIG. 8 shows a diagram illustrating an example format of the HE-SIG-B of the HE packet in case of CBW=40 MHz according to a third embodiment of the present disclosure.

FIG. 9 shows a diagram illustrating an example format of the HE-SIG-B of the HE packet in case of CBW=40 MHz according to a fourth embodiment of the present disclosure.

FIG. 10 shows a diagram illustrating an example format of the HE-SIG-B of the HE packet in case of CBW=40 MHz according to a fifth embodiment of the present disclosure.

FIG. 11 shows a diagram illustrating an example format of the HE-SIG-B of the HE packet in case of CBW=40 MHz according to a sixth embodiment of the present disclosure.

FIG. 12 shows a block diagram illustrating an example configuration of AP according to the present disclosure.

FIG. 13 shows a block diagram illustrating an example configuration of STA according to the present disclosure.

FIG. 14 shows a diagram illustrating an example format of the HE packet used for SU partial band transmission according to the present disclosure.

FIG. 15 shows a diagram illustrating an example format of the HE-SIG-B of the HE packet used for SU partial band transmission according to a twelfth of the present disclosure.

FIG. 16 shows a diagram illustrating an example format of the HE-SIG-B of the HE packet used for SU partial band transmission according to a thirteenth embodiment of the present disclosure.

DETAILED DESCRIPTION

Various embodiments of the present disclosure will now be described in detail with reference to the annexed drawings. In the following description, a detailed description of known functions and configurations has been omitted for clarity and conciseness.

FIG. 1 illustrates the format of a High Efficiency (HE) packet 100 complying with the IEEE 802.11ax specification framework document. The HE packet 100 includes: a legacy preamble comprising a legacy short training field (L-STF) 102, a legacy long training field (L-LTF) 104 and a legacy signal field (L-SIG) 106; an HE preamble comprising a repeated L-SIG field (RL-SIG) 108, a first HE signal field (HE-SIG-A) 110, a second HE signal field (HE-SIG-B) 112, an HE short training field (HE-STF) 114 and an HE long training field (HE-LTF) 116; and a HE data field 120.

The legacy preamble (102, 104, 106) is used to facilitate backwards compatibility with the legacy 802.11a/g/n/ac standards. The L-STF 102 and L-LTF 104 are primarily used for packet detection, auto gain control (AGC) setting, frequency offset estimation, time synchronization and channel estimation. The L-SIG 106, together with the RL-SIG 108 in the HE preamble, is used to assist in differentiating the HE packet 100 from the legacy 802.11a/g/n/ac packets.

The HE-SIG-A 110 in the HE preamble carries common control information required to interpret the remaining fields of the HE packet 100, e.g., CBW (Channel Bandwidth), the number of HE-SIG-B symbols and the MCS (Modulation and Coding Scheme) used for the HE-SIG-B 112, etc.

The HE-SIG-B 112 in the HE preamble contains resource assignment information and per-user allocation information for designated receiving STAs especially for downlink (DL) multiuser (MU) transmission. The HE-SIG-B 112 does not exist in the HE packet 100 if it intends to be used for single user (SU) transmission or for uplink (UL) MU transmission. For UL MU transmission, resource assignment information and per-user allocation information for designated transmitting STAs are preset at the AP and transmitted in a trigger frame by the AP to the designated transmitting STAs.

The HE-STF 114 in the HE preamble is used to reset AGC and reduces the dynamic range requirement on the ADC (Analog-to-Digital Converter). The HE-LTF 116 in the HE preamble is provided for MIMO (Multiple Input Multiple Output) channel estimation for receiving and equalizing the HE data field 120.

The HE data field 120 carries the payload for one or more STAs. For a specific STA in terms of SU transmission or a specific group of STAs in terms of MU-MIMO transmission, the payload is carried on a designated resource in units of RU spanning a plurality of OFDM symbols. A RU may have different types depending on the number of constituent subcarriers per RU. OFDM symbols in the HE data field 120 shall use a DFT (Discrete Fourier Transform) period of 12.8 μs and subcarrier spacing of 78.125 kHz. The number of subcarriers per OFDM symbol depends on the value of CBW. For example, in case of CBW=40 MHz, the number of subcarriers per OFDM symbol is 512. Therefore for a specific type of RU, the maximum number of RUs per OFDM symbol depends on a size of CBW as well.

FIG. 2 illustrates an example OFDMA structure of the HE data field 120 of the HE packet 100 in case of CBW=40 MHz. The Type I RU comprises 26 consecutive tones and has a bandwidth of about 2 MHz. The Type II RU comprises 52 consecutive tones and has a bandwidth of about 4.1 MHz. The Type III RU comprises 106 consecutive tones and has a bandwidth of about 8.3 MHz. The Type IV RU comprises 242 consecutive tones and has a bandwidth of about 18.9 MHz. The Type V RU comprises 484 consecutive tones and has a bandwidth of about 37.8 MHz. The maximum number of Type I RUs, Type II RUs, Type III RUs, Type IV RUs and Type V RUs which the 40 MHz OFDMA is able to support is eighteen, eight, four, two and one, respectively. A mix of different types of RUs can also be accommodated in the 40 MHz OFDMA.

Details of transmission processing for the L-STF 102, L-LTF 104, L-SIG 106, RL-SIG 108, HE-SIG-A 110, HE-SIG-B 112, HE-STF 114, HE-LTF 116 and HE data field 120 can be found in the IEEE 802.11ax specification framework document.

In particular, the HE-SIG-B 112 is encoded on a per 20 MHz subband basis. For CBW=40 MHz, 80 MHz, 160 MHz or 80+80 MHz, the number of 20 MHz subbands carrying different content is two. The HE-SIG-B symbols shall use a DFT period of 3.2 μs and subcarrier spacing of 312.5 kHz. The number of data subcarriers per HE-SIG-B symbol is 52.

FIG. 3 illustrates an example structure of the HE-SIG-B 112 of the HE packet 100 in case of CBW=40 MHz. The HE-SIG-B 112 comprises two channel fields: HE-SIG-B1 302 and HE-SIG-B2 304 that use different frequency subband channels. The HE-SIG-B1 302 is transmitted over the first 20 MHz subband channel 322 while the HE-SIG-B2 304 is transmitted over the second 20 MHz subband channel 324.

The resource assignment information and per-user allocation information for one allocation that is fully located within a 20 MHz subband channel are carried in one of the two HE-SIG-B channel fields and are transmitted over the same 20 MHz subband channel. In more details, the HE-SIG-B1 302 carries resource assignment information and per-user allocation information for the allocations (e.g., 312) that are fully located within the first 20 MHz subband channel 322, while the HE-SIG-B2 304 carries resource assignment information and per-user allocation information for the allocations (e.g., 314) that are fully located within the second 20 MHz subband channel 324. In this way, even if control signaling in a 20 MHz subband channel (e.g., 322) is corrupted due to interference, the control signaling in another 20 MHz subband channel (e.g., 324) can be decoded properly.

FIG. 4 illustrates an example format of the HE-SIG-B 112 of the HE packet 100 in case of CBW=40 MHz. Each of the two HE-SIG-B channel fields comprises a common field 410 and a user-specific field 450. Each common field 410 comprises a resource allocation subfield 412, a CRC (Cyclic Redundancy Check) subfield and a tail bits subfield, each of which has a predetermined length.

In context of the HE-SIG-B1 302 in FIG. 3, the resource allocation subfield 412-1 in FIG. 4 contains a RU arrangement pattern index which indicates a specific RU arrangement pattern in the frequency domain (including MU-MIMO related information) for the first 20 MHz subband channel 322. The mapping of RU arrangement pattern indices and the corresponding RU arrangement patterns is predetermined. An example mapping of RU arrangement pattern indices and the corresponding RU arrangement patterns is shown in Table 1. Notice that RUs are arranged from lower frequency to higher frequency in the frequency domain within a 20 MHz subband channel and Type I RUs and Type II RUs can be used for SU-MIMO transmission only.

TABLE 1

Mapping of RU arrangement pattern indices and the corresponding RU arrangement patterns

| RU Arrangement Pattern Index | RU Arrangement Pattern |
|---|---|
| 0 | 9 Type I RUs |
| 1 | 1 Type II RU, followed by 7 Type I RUs |
| 2 | 2 Type I RUs, followed by 1 Type II RU and 5 Type I RUs |
| 3 | 5 Type I RUs, followed by 1 Type II RU and 2 Type I RUs |
| 4 | 7 Type I RUs, followed by 1 Type II RU |
| 5 | 2 Type II RUs, followed by 5 Type I RUs |
| 6 | 1 Type II RU, followed by 3 Type I RUs, 1 Type II RU and 2 Type I RUs |
| 7 | 1 Type II RU, followed by 5 Type I RUs and 1 Type II RU |
| 8 | 2 Type I RUs, followed by 1 Type II RU, 1 Type I RU, 1 Type II RU and 2 Type I RUs |
| 9 | 2 Type I RUs, followed by 1 Type II RU, 3 Type I RUs and 1 Type II RU |
| 10 | 5 Type I RUs, followed by 2 Type II RUs |
| 11 | 2 Type II RUs, followed by 1 Type I RU, 1 Type II RU and 2 Type I RUs |
| 12 | 2 Type II RUs, followed by 3 Type I RUs and 1 Type II RU |
| 13 | 1 Type II RU, followed by 3 Type I RUs and 2 Type II RUs |
| 14 | 2 Type I RUs, followed by 1 Type II RU, 1 Type I RU and 2 Type II RUs |
| 15 | 2 Type II RUs, followed by I Type I RU and 2 Type II RUs |
| 16 | 1 Type III RU for SU-MIMO transmission, followed by 5 Type I RUs |
| 17 | 1 Type III RU for SU-MIMO transmission, followed by 3 Type I RUs and 1 Type II RU |
| 18 | 1 Type III RU for SU-MIMO transmission, followed by 1 Type I RU, 1 Type II RU and 2 Type I RUs |
| 19 | 1 Type III RU for SU-MIMO transmission, followed by 1 Type I RU and 2 Type II RUs |
| 20 | 1 Type III RU for SU-MIMO transmission, followed by 1 Type I RU and 1 Type III RU for SU-MIMO transmission |
| 21 | 5 Type I RUs, followed by 1 Type III RU for SU-MIMO transmission |
| 22 | 1 Type II RU, followed by 3 Type I RUs and 1 Type III RU for SU-MIMO transmission |
| 23 | 2 Type I RUs, followed by 1 Type II RU, 1 Type I RU and 1 Type III RU for SU-MIMO transmission |
| 24 | 2 Type II RUs, followed by 1 Type I RU and 1 Type III RU for SU-MIMO transmission |
| 25 | 5 Type I RUs, followed by 1 Type III RU for MU-MIMO transmission with 2 users multiplexed |
| 26 | 5 Type I RUs, followed by 1 Type III RU for MU-MIMO transmission with 3 users multiplexed |
| 27 | 5 Type I RUs, followed by 1 Type III RU for MU-MIMO transmission with 4 users multiplexed |
| 28 | 5 Type I RUs, followed by 1 Type III RU for MU-MIMO transmission with 5 users multiplexed |
| 29 | 5 Type I RUs, followed by 1 Type III RU for MU-MIMO transmission with 6 users multiplexed |
| 30 | 5 Type I RUs, followed by 1 Typo III RU for MU-MIMO transmission with 7 users multiplexed |
| 31 | 5 Type I RUs, followed by 1 Type III RU for MU-MIMO transmission with 8 users multiplexed |
| . . . | . . . |

With reference to Table 1, for example, the resource allocation subfield 412-1 in FIG. 4 included in the HE-SIG-B1 302 in FIG. 3 may contain a RU arrangement pattern index of 25 to indicate a specific RU arrangement pattern for the first 20 MHz subband channel where five Type I RUs are followed by one Type III RU in the frequency domain, and each of five Type I RUs is used for SU-MIMO transmission while the Type III RU is used for MU-MIMO transmission with two users multiplexed. Similarly, in context of the HE-SIG-B2 304 in FIG. 3, the resource allocation subfield 412-2 in FIG. 4 may contain another RU arrangement pattern index that indicates a specific RU arrangement pattern in the frequency domain and MU-MIMO related information for the second 20 MHz subband channel 324.

Each user-specific field 450 in FIG. 4 comprises a plurality of BCC (Binary Convolutional Coding) blocks. Each of the BCC blocks except the last BCC block comprises a first user-specific subfield, a second user-specific subfield, a CRC subfield and a tail bits subfield, each of which has a predetermined length. The last BCC block may comprise a single user-specific subfield. Each of user-specific subfields in the user-specific field 450 carries per-user allocation information (e.g., the STA identifier for addressing and the user-specific transmission parameters such as the number of spatial streams and MCS, etc.). For each RU assigned for SU-MIMO transmission, there is only a single corresponding user-specific subfield. For each RU assigned for MU-MIMO transmission with K users multiplexed, there are K corresponding user-specific subfields. The ordering of user-specific subfields in the user-specific field 450 of one HE-SIG-B channel field is compliant with the RU arrangement pattern signaled by the resource allocation subfield 412 of the same HE-SIG-B channel. The number of the user-specific subfields in the user-specific field 450 of one HE-SIG-B channel can be derived from the resource allocation subfield 412 of the same HE-SIG-B channel.

It should be noted that padding bits may be appended to the end of the HE-SIG-B1 302 and/or the HE-SIG-B2 304 for the last symbol alignment and for keeping the same time duration between the HE-SIG-B1 302 and the HE-SIG-B2 304.

However, there may exist significant load imbalance between the two HE-SIG-B channel fields 302 and 304 (i.e., one HE-SIG-B channel field may be much longer than the other HE-SIG-B channel field in length before appending the padding bits). In the example of FIG. 5, there are three allocations over the first 20 MHz subband channel 322, which are used for MU-MIMO transmission with six users multiplexed, SU-MIMO transmission and MU-MIMO transmission with seven users multiplexed, respectively. Here, each BCC block comprises two user-specific subfields. Thus, the number of user-specific subfields $N_{uss,1}$ and the number of BCC blocks $N_{blk,1}$ in the HE-SIG-B1 302 is 14 and 7, respectively. On the other hand, there are six allocations over the second 20 MHz subband channel 324, each of which is used for SU-MIMO transmission. Thus, the number of user-specific subfields $N_{uss,2}$ and the number of BCC blocks $N_{blk,2}$ in the HE-SIG-B2 304 is 6 and 3, respectively. Assume that:

each common field 510 has a length of $L_{cf}=22$ bits;
each user-specific subfield has a length of $L_{uss}=22$ bits and each BCC block comprising two user-specific subfields has a length of $L_{blk}=54$ bits; and
the MCS used for the HE-SIG-B 112 is VHT-MCS1 (see IEEE 802.11ac standard) where the number of data bits per HE-SIG-B symbol $N_{DBPS}$ is 52.

So the number of HE-SIG-B symbols $N_{sym}$ in this example is 8, which can be calculated by

[Math. 1]
$$N_{sym} = \max\left\{\left\lceil \frac{L_{cf} + L_{blk} \times N_{blk,1} - \alpha_1 \times L_{uss}}{N_{DBPS}} \right\rceil, \left\lceil \frac{L_{cf} + L_{blk} \times N_{blk,2} - \alpha_2 \times L_{uss}}{N_{DBPS}} \right\rceil\right\} \quad (1)$$

where
$\lceil x \rceil$ represents the smallest integer not less than x, and

[Math. 2]
$$\alpha_i = \begin{cases} 0, & \text{if } N_{uss,i} \text{ is an even number} \\ 1, & \text{otherwise} \end{cases}, i = 0, 1. \quad (2)$$

In order to keep the same time duration between the HE-SIG-B1 302 and the HE-SIG-B2 304 in this example, a few padding symbols need to be appended to the end of the HE-SIG-B2 304. It can be concluded that if one HE-SIG-B channel field is much longer than the other HE-SIG-B channel field, significant number of padding symbols are required for the other HE-SIG-B channel field, resulting in significant overhead for reporting control signaling and compromised channel efficiency.

Next, various embodiments for the format of the HE-SIG-B 112 will be explained in further details, which can reduce overhead for reporting control signaling and improve channel efficiency significantly.

According to a first aspect of the present disclosure, a part of the user-specific field of one HE-SIG-B channel field that is longer than the other HE-SIG-B channel field in length before appending the padding bits is relocated to the other HE-SIG-B channel field so that the number of HE-SIG-B symbols is minimized. Thus, overhead for reporting control signaling is reduced and channel efficiency is improved. The relocated part of the user-specific field is located at a predetermined position of the other HE-SIG-B channel field. The relocated part of the user-specific field may be transmitted using a transmission scheme that is more robust than that used for transmitting the other part of the user-specific field. As a result, STAs are able to decode the relocated part of the user-specific field properly even if the other HE-SIG-B channel field has a poor channel quality due to interference.

First Embodiment

According to a first embodiment of the present disclosure, one or more last BCC blocks of the user-specific field of one HE-SIG-B channel field which is longer than the other HE-SIG-B channel field in length before appending the padding bits are relocated to the other HE-SIG-B channel. By this relocation, the number of HE-SIG-B symbols is minimized. Thus, overhead for reporting control signaling is reduced and channel efficiency is improved.

If the other HE-SIG-B channel field has a poor channel quality due to interference, the STAs whose corresponding BCC blocks are relocated to the other HE-SIG-B channel may not be able to decode resource allocation signaling in the other HE-SIG-B channel field properly and thus they cannot determine the number of original BCC blocks in the other HE-SIG-B channel field. In this case, if the relocated BCC blocks are located immediately after the original BCC blocks in the other HE-SIG-B channel field, the STAs cannot determine the start of the relocated BCC blocks and decode them properly.

According to the first embodiment of the present disclosure, the relocated BCC blocks are located at a predetermined position of the other HE-SIG-B channel field (e.g., at the end of the other HE-SIG-B channel field). The relocated BCC blocks may be duplicated one or more times in the other HE-SIG-B channel field. As a result, even if the other HE-SIG-B channel field has a poor channel quality due to interference, the STAs may still be able to decode the relocated BCC blocks properly.

According to the first embodiment of the present disclosure, the number of relocated BCC blocks $N_{rblk}$ can be calculated by

[Math. 3]
$$N_{rblk} = \left\lfloor \frac{\max\{N_{blk,1}, N_{blk,2}\} - \min\{N_{blk,1}, N_{blk,2}\}}{1+R} \right\rfloor, \quad (3)$$

Where R is repetition factor and $\lfloor x \rfloor$ represents the largest integer not more than x.

FIG. 6 illustrates an example format of the HE-SIG-B 112 of the HE packet 100 in case of CBW=40 MHz according to the first embodiment of the present disclosure. Each of the two HE-SIG-B channel fields comprises a common field 610 and a user-specific field 650. Each common field 610 comprises a resource allocation subfield, a number of relocated BCC blocks subfield 614, a repetition subfield 616, a CRC subfield and a tail bits subfield. The number of relocated BCC blocks subfield 614 of one HE-SIG-B channel field has a predetermined length and indicates how many BCC blocks have been relocated from the one HE-SIG-B channel field to the other HE-SIG-B channel field. The repetition subfield 616 of one HE-SIG-B channel has a predetermined length and indicates how many times the relocated BCC blocks are duplicated in the other HE-SIG-B channel field (i.e., indicates the value of the repetition factor R). Based on both the number of relocated BCC blocks subfield 614 and the repetition subfield 616 of one HE-SIG-B channel field, the STAs can determine the start of the relocated BCC blocks in the other HE-SIG-B channel field, perform MRC (Maximum Ratio Combining) on the relocated BCC blocks if the repetition factor R is more than 1, and decode them properly.

Considering FIG. 6 is based on the same resource allocation as FIG. 5, the number of user-specific subfields $N_{uss,1}$ and the number of BCC blocks $N_{blk,1}$ for the HE-SIG-B1 302 is 14 and 7, respectively. The number of user-specific subfields $N_{uss,2}$ and the number of BCC blocks $N_{blk,2}$ for the HE-SIG-B2 304 is 6 and 3, respectively. Assume that each common field 610 has a length of $L_{cf}$=22 bits;
each user-specific subfield has a length of $L_{uss}$=22 bits and each BCC block comprising two user-specific subfields has a length of $L_{blk}$=54 bits;
the MCS used for the HE-SIG-B 112 is VHT-MCS1 where $N_{DBPS}$=52; and
the repetition factor R=2.

It is easy to derive $N_{rblk}$=1 from Equation (3). So the number of HE-SIG-B symbols $N_{sym}$ becomes 7, which can be calculated by

[Math. 4]
$$N_{sym} = \max\left\{ \left\lceil \frac{L_{cf} + L_{blk} \times (N_{blk,1} - N_{rblk})}{N_{DBPS}} \right\rceil, \left\lceil \frac{L_{cf} + L_{blk} \times (N_{blk,2} + R \times N_{rblk}) - (\alpha_2 + \alpha_1) \times L_{uss}}{N_{DBPS}} \right\rceil \right\}, \quad (4)$$

where

[Math. 5]
$$\alpha_i = \begin{cases} 0, \text{ if } N_{uss,i} \text{ is an even number} \\ 1, \text{ otherwise} \end{cases}, i = 0, 1. \quad (5)$$

In other words, based on the same resource allocation, the first embodiment may require less HE-SIG-B symbols than the prior art.

Note that in the example of FIG. 6, the number of relocated BCC blocks subfield 614-1 in the HE-SIG-B1 302 shall indicate a single relocated BCC block and the repetition subfield 616-1 in the HE-SIG-B1 302 shall indicate that the relocated BCC block is duplicated once (i.e., the repetition factor R=2); while the number of relocated BCC blocks subfield 614-2 in the HE-SIG-B2 304 shall indicate that there are no relocated BCC blocks.

According to the first embodiment of the present disclosure, as an alternative to signal the number of relocated BCC blocks and the value of the repetition factor R for the HE-SIG-B1 302 and the HE-SIG-B2 304 in their respective common field 610, the number of relocated BCC blocks and the repetition factor R for the HE-SIG-B1 302 and the HE-SIG-B2 304 can be signaled in the HE-SIG-A 110.

Second Embodiment

According to a second embodiment of the present disclosure, one or more last BCC blocks of the user-specific field of one HE-SIG-B channel field which is longer than the other HE-SIG-B channel field in length before appending the padding bits are relocated to the other HE-SIG-B channel field so that the number of HE-SIG-B symbols is minimized. Thus overhead for reporting control signaling is reduced and channel efficiency is improved.

According to the second embodiment of the present disclosure, the relocated BCC blocks are located at a predetermined position of the other HE-SIG-B channel field (e.g., at the end of the other HE-SIG-B channel field). The relocated BCC blocks may be transmitted with a more robust MCS than the MCS used for other BCC blocks. As a result, even if the other HE-SIG-B channel field has a poor channel quality due to interference, the STAs may still be able to decode the relocated BCC blocks properly.

According to the second embodiment of the present disclosure, the number of relocated BCC blocks $N_{rblk}$ can be calculated by

[Math. 6]
$$N_{rblk} = \left\lfloor \frac{\max\{N_{blk,1}, N_{blk,2}\} - \min\{N_{blk,1}, N_{blk,2}\}}{1 + N_{DBPS,oblk}/N_{DBPS,rblk}} \right\rfloor, \quad (6)$$

Where $N_{DBPS, rblk}$ is the number of data bits per symbol for relocated BCC blocks, and $N_{DBPS, oblk}$ is the number of data bits per symbol for other BCC blocks.

FIG. 7 illustrates an example format of the HE-SIG-B 112 of the HE packet 100 in case of CBW=40 MHz according to the second embodiment of the present disclosure. Each of the two HE-SIG-B channel fields comprises a common field 710 and a user-specific field 750. Each common field 710 comprises a resource allocation subfield, a number of relocated BCC blocks subfield 714, a MCS of relocated BCC blocks subfield 716, a CRC subfield and a tail bits subfield. The number of relocated BCC blocks subfield 714 of one HE-SIG-B channel field has a predetermined length and indicates how many BCC blocks have been relocated from the one HE-SIG-B channel field to the other HE-SIG-B channel field. The MCS of relocated BCC blocks subfield 716 of one HE-SIG-B channel field has a predetermined length and indicates the MCS that is used for the relocated BCC blocks in the other HE-SIG-B channel. Note that the MCS used for BCC blocks in the HE-SIG-B 112 other than the relocated BCC blocks can be indicated in the HE-SIG-A 110. Based on both the number of relocated BCC blocks subfield 714 and the MCS of relocated BCC blocks subfield 716 in one HE-SIG-B channel field, the STAs can determine the start of the relocated BCC blocks in the other HE-SIG-B channel field and decode them properly.

Considering FIG. 7 is based on the same resource allocation as FIG. 5 and FIG. 6, the number of user-specific subfields $N_{uss,1}$ and the number of BCC blocks $N_{blk,1}$ for the HE-SIG-B1 302 is 14 and 7, respectively, while the number of user-specific subfields $N_{uss,2}$ and the number of BCC blocks $N_{blk,2}$ for the HE-SIG-B2 304 is 6 and 3, respectively. Assume that each common field 710 has a length of $L_{cf}$=22 bits;
each user-specific subfield has a length of $L_{uss}$=22 bits and each BCC block comprising two user-specific subfields has a length of $L_{blk}$=54 bits;
the MCS used for relocated BCC blocks is VHT-MCS0 where $N_{DBPS, rblk}$=26; and
the MCS used for other BCC blocks is VHT-MCS1 where $N_{DBPS,oblk}$=52.

It is easy to derive $N_{rblk}$=1 from Equation (6). So the number of the HE-SIG-B symbols $N_{sym}$ becomes 7, which can be calculated by

[Math. 7]
$$N_{sym} = \max\left\{ \left\lceil \frac{L_{cf} + L_{blk} \times (N_{blk,1} - N_{rblk})}{N_{DBPS,oblk}} \right\rceil, \left\lceil \frac{L_{cf} + L_{blk} \times N_{blk,2} - \alpha_2 \times L_{uss}}{N_{DBPS,oblk}} + \frac{L_{blk} \times N_{rblk} - \alpha_1 \times L_{uss}}{N_{DBPS,rblk}} \right\rceil \right\}, \quad (7)$$

where

[Math. 8]
$$\alpha_i = \begin{cases} 0, \text{ if } N_{uss,i} \text{ is an even number} \\ 1, \text{ otherwise} \end{cases}, i = 0, 1. \quad (8)$$

In other words, based on the same resource allocation, the second embodiment may require less HE-SIG-B symbols than the prior art.

Note that in the example of FIG. 7, the number of relocated BCC blocks subfield 714-1 in the HE-SIG-B1 302 shall indicate a single relocated BCC block and the MCS of relocated BCC blocks subfield 716-1 in the HE-SIG-B1 302 shall indicate the VHT-MCS0; while the number of relocated BCC blocks subfield 714-2 in the HE-SIG-B2 304 shall indicate no relocated BCC blocks.

According to the second embodiment of the present disclosure, as an alternative to signal the number of relocated BCC blocks and the MCS of relocated BCC blocks for the HE-SIG-B1 302 and the HE-SIG-B2 304 in their respective common field 710, the number of relocated BCC blocks and the MCS of relocated BCC blocks for the HE-SIG-B1 302 and the HE-SIG-B2 304 can be signaled in the HE-SIG-A 110.

Third Embodiment

According to a third embodiment of the present disclosure, one or more last BCC blocks of the user-specific field of one HE-SIG-B channel field which is longer than the other HE-SIG-B channel field in length before appending the padding bits are relocated to the other HE-SIG-B channel field so that the number of HE-SIG-B symbols is minimized. Thus, overhead for reporting control signaling is reduced and channel efficiency is improved.

According to the third embodiment of the present disclosure, the relocated BCC blocks are located at a predetermined position of the other HE-SIG-B channel field (e.g., at the end of the other HE-SIG-B channel field). The relocated BCC blocks may be transmitted with higher power than the other BCC blocks. As a result, even if the other HE-SIG-B channel field has a poor channel quality due to interference, the STAs may still be able to decode the relocated BCC blocks properly. However, power boosting of the relocated BCC blocks may result in higher PAPR (Peak-to-Average Power Ratio).

According to the third embodiment of the present disclosure, the number of relocated BCC blocks $N_{rblk}$ can be calculated by

[Math. 9]

$$N_{rblk} = \left\lfloor \frac{\max\{N_{blk,1}, N_{blk,2}\} - \min\{N_{blk,1}, N_{blk,2}\}}{2} \right\rfloor. \quad (9)$$

FIG. 8 illustrates an example format of the HE-SIG-B 112 of the HE packet 100 in case of CBW=40 MHz according to the third embodiment of the present disclosure. Each of the two HE-SIG-B channels comprises a common field 810 and a user-specific field 850. Each common field 810 comprises a resource allocation subfield, a number of relocated BCC blocks subfield 814, a CRC subfield and a tail bits subfield. The number of relocated BCC blocks subfield 814 of one HE-SIG-B channel field has a predetermined length and indicates how many BCC blocks have been relocated from the one HE-SIG-B channel field to the other HE-SIG-B channel field. Based on the number of relocated BCC blocks subfield 814 in one HE-SIG-B channel field, the STAs can determine the start of the relocated BCC blocks in the other HE-SIG-B channel field and decode them properly.

Considering FIG. 8 is based on the same resource allocation as FIG. 5 to FIG. 7, the number of user-specific subfields $N_{uss,1}$ and the number of BCC blocks $N_{blk,1}$ for the HE-SIG-B1 302 is 14 and 7, respectively. The number of user-specific subfields $N_{uss,2}$ and the number of BCC blocks $N_{blk,2}$ for the HE-SIG-B2 304 is 6 and 3, respectively. Assume that
- each common field 810 has a length of $L_{cf}$=22 bits;
- each user-specific subfield has a length of $L_{uss}$=22 bits and each BCC block comprising two user-specific subfields has a length of $L_{blk}$=54 bits; and
- the MCS used for the HE-SIG-B 112 is VHT-MCS1 where $N_{DBPS}$=52.

It is easy to derive $N_{rblk}$=2 from Equation (9). So the number of the HE-SIG-B symbols $N_{sym}$ becomes 6, which can be calculated by

[Math. 10]

$$N_{sym} = \max\left\{ \left\lceil \frac{L_{cf} + L_{blk} \times (N_{blk,1} - N_{rblk})}{N_{DBPS}} \right\rceil, \left\lceil \frac{L_{cf} + L_{blk} \times (N_{blk,2} + N_{rblk}) - (\alpha_2 + \alpha_1) \times L_{uss}}{N_{DBPS}} \right\rceil \right\}, \quad (10)$$

where

[Math. 11]

$$\alpha_i = \begin{cases} 0, & \text{if } N_{uss,i} \text{ is an even number} \\ 1, & \text{otherwise} \end{cases}, i = 0, 1. \quad (11)$$

In other words, based on the same resource allocation, the third embodiment may require less HE-SIG-B symbols than the prior art, the first embodiment or the second embodiment.

Note that in the example of FIG. 8, the number of relocated BCC blocks subfield 814-1 in the HE-SIG-B1 302 shall indicate a single relocated BCC block; while the number of relocated BCC blocks subfield 814-2 in the HE-SIG-B2 304 shall indicate no relocated BCC blocks.

According to the third embodiment of the present disclosure, as an alternative to signal the number of relocated BCC blocks for the HE-SIG-B1 302 and the HE-SIG-B2 304 in their respective common field 810, the number of relocated BCC blocks for the HE-SIG-B1 302 and the HE-SIG-B2 304 can be signaled in the HE-SIG-A 110.

According to the first three embodiments of the present disclosure, the two HE-SIG-B channel fields (except the relocated BCC blocks in the second embodiment) make use of the same MCS, which is signaled in the HE-SIG-A 110. This common MCS for the two HE-SIG-B channel fields shall be determined so that all STAs scheduled in both the first 20 MHz subband channel 322 and the second 20 MHz subband channel 324 have an acceptable probability (e.g., 90%) of decoding the HE-SIG-B 112 successfully.

According to a second aspect of the present disclosure, the MCS for one HE-SIG-B channel field may be different from the MCS used for the other HE-SIG-B channel field. Furthermore, the MCS used for one HE-SIG-B channel field which is longer than the other HE-SIG-B channel field may be less robust than the MCS used for the other HE-SIG-B channel field so that the number of HE-SIG-B symbols is minimized. Thus overhead for reporting control signaling is reduced and channel efficiency is improved.

Fourth Embodiment

According to a fourth embodiment of the present disclosure, a first MCS and a second MCS are used for the HE-SIG-B1 302 and the HE-SIG-B2 304, respectively. The first MCS for the HE-SIG-B1 302 shall be determined so that STAs scheduled in the first 20 MHz subband channel 322 have an acceptable probability (e.g., 90%) of decoding the HE-SIG-B1 302 successfully. Similarly, the second MCS for the HE-SIG-B2 304 shall be determined so that STAs scheduled in the second subband channel 324 have an acceptable probability (e.g., 90%) of decoding the HE-SIG-B2 304 successfully. Since either the first MCS used for the HE-SIG-B1 302 or the second MCS used for the HE-SIG-B2 304 only takes into account a portion of STAs scheduled in both the first 20 MHz subband channel 322 and the second 20 MHz subband channel 324, one of the first MCS used for the HE-SIG-B1 302 and the second MCS used for the HE-SIG-B2 304 may be less robust than the common MCS employed in the first three embodiments. Note that unlike the first three embodiments, no any BCC blocks in either the HE-SIG-B1 302 or the HE-SIG-B2 304 need to be relocated according to the fourth embodiment of the present disclosure.

According to the fourth embodiment of the present disclosure, in addition to the signaling of indication the number of HE-SIG-B symbols, a signaling is required in the HE-SIG-A 110 to indicate the first MCS used for the HE-SIG-B1 302 and the second MCS used for the HE-SIG-B2 304. Based on such signaling, STAs are able to decode the two HE-SIG-B channel fields properly.

According to the fourth embodiment of the present disclosure, if the HE-SIG-B1 302 is much longer than the HE-SIG-B2 304 in length before appending the padding bits (i.e., the HE-SIG-B1 302 includes much more user-specific subfields than the HE-SIG-B2 304), the first MCS used for the HE-SIG-B1 302 may be set to be less robust than the second MCS used for the HE-SIG-B2 304 so that the number of HE-SIG-B symbols is minimized. Thus overhead for reporting control signaling is reduced and channel efficiency is improved. If the HE-SIG-B2 304 is much longer than the HE-SIG-B1 302 in length before appending the padding bits, the second MCS used for the HE-SIG-B2 304 may be set to be less robust than the first MCS used for the HE-SIG-B1 302 so that the number of HE-SIG-B symbols is minimized and channel efficiency is improved. If the HE-SIG-B2 304 has a similar length to the HE-SIG-B1 302, the first MCS used for the HE-SIG-B1 302 may be set to be the same as the second MCS used for the HE-SIG-B2 304.

FIG. 9 illustrates an example format of the HE-SIG-B 112 in case of CBW=according to the fourth embodiment of the present disclosure. Each of the two HE-SIG-B channels comprises a common field 910 and a user-specific field 950.

Considering FIG. 9 is based on the same resource allocation as FIG. 5 to FIG. 8, the number of user-specific subfields $N_{uss,1}$ and the number of BCC blocks $N_{blk,1}$ for the HE-SIG-B1 302 is 14 and 7, respectively. The number of user-specific subfields $N_{uss,2}$ and the number of BCC blocks $N_{blk,2}$ for the HE-SIG-B2 304 is 6 and 3, respectively. Since the HE-SIG-B1 302 is much longer than the HE-SIG-B2 304 in length before appending the padding bits in this example, the first MCS used for the HE-SIG-B1 302 is set to be less robust than the second MCS used for the HE-SIG-B2 304 so that the number of HE-SIG-B symbols is minimized. For example, the first MCS used for the HE-SIG-B1 302 is set to VHT-MCS2 where $N_{DBPS,1}$=78 while the second MCS used for the HE-SIG-B2 304 is set to VHT-MCS1 where $N_{DBPS,2}$=52. Assume that each common field 910 has a length of $L_{cf}$=22 bits; and each user-specific subfield has a length of $L_{uss}$=22 bits and each BCC block comprising two user-specific subfields has a length of $L_{blk}$=54 bits.

So the number of the HE-SIG-B symbols $N_{sym}$ becomes 6, which can be calculated by

[Math. 12]

$$N_{sym} = \max\left\{\left\lceil\frac{L_{cf} + L_{blk} \times N_{blk,1} - \alpha_1 \times L_{uss}}{N_{DBPS,1}}\right\rceil, \left\lceil\frac{L_{cf} + L_{blk} \times N_{blk,2} - \alpha_2 \times L_{uss}}{N_{DBPS,2}}\right\rceil\right\} \quad (12)$$

where

[Math. 13]

$$\alpha_i = \begin{cases} 0, \text{if } N_{uss,i} \text{ is an even number} \\ 1, \text{otherwise} \end{cases}, i = 0, 1. \quad (13)$$

In other words, based on the same resource allocation, the fourth embodiment may require less HE-SIG-B symbols than the prior art, the first embodiment or the second embodiment.

According to a third aspect of the present disclosure, for some specific resource allocation, the common field (including resource allocation signaling) of each of the two HE-SIG-B channel fields can be ignored so that the number of HE-SIG-B symbols is minimized. Thus, overhead for reporting control signaling is reduced and channel efficiency is improved.

Fifth Embodiment

According to a fifth embodiment of the present disclosure, if a single RU of a particular type (e.g., Type IV RU) is allocated over each of the first 20 MHz subband channel 322 and the second 20 MHz subband channel 324 and the same number of users are scheduled in each of the first 20 MHz subband channel 322 and the second 20 MHz subband channel 324, each of the two HE-SIG-B channel fields may contain the user-specific field only so that the number of HE-SIG-B symbols is minimized. Thus, overhead for reporting control signaling is reduced and channel efficiency is improved.

FIG. 10 illustrates an example format of the HE-SIG-B 112 of the HE packet 100 in case of CBW=40 MHz according to the fifth embodiment of the present disclosure. In this example, a single Type IV RU used for MU-MIMO transmission with six users multiplexed is allocated over each of the first 20 MHz subband channel 322 and the second 20 MHz subband channel 324. So each of the HE-SIG-B1 302 and the HE-SIG-B2 304 contains the user-specific field 1050 only. The number of user-specific subfields $N_{uss}$ and the number of BCC blocks $N_{blk}$ per HE-SIG-B channel field is 6 and 3, respectively. Assume that each user-specific subfield has a length of $L_{uss}$=22 bits and each BCC block comprising two user-specific subfields has a length of $L_{blk}$=54 bits; and the MCS used for the HE-SIG-B 112 is VHT-MCS1 where $N_{DBPS}$=52.

So the number of the HE-SIG-B symbols $N_{sym}$ is 4, which can be calculated by

[Math. 14]

$$N_{sym} = \left\lceil \frac{L_{blk} \times N_{blk} - \alpha \times L_{uss}}{N_{DBPS}} \right\rceil. \quad (14)$$

where

[Math. 15]

$$\alpha = \begin{cases} 0, \text{ if } N_{uss} \text{ is an even number} \\ 1, \text{ otherwise} \end{cases} \quad (15)$$

According to the fifth embodiment of the present disclosure, in addition to the signaling of indicating the number of HE-SIG-B symbols and the MCS used for the HE-SIG-B 112, a signaling is required in the HE-SIG-A 110 to indicate the presence of a specific resource allocation where a single RU of a particular type is allocated over each of the first 20 MHz subband channel 322 and the second 20 MHz subband channel 324 and the same number of users are scheduled in each of the first 20 MHz subband channel 322 and the second 20 MHz subband channel 324. Based on such signaling, STAs are able to decode the HE-SIG-B 112 properly.

According to the fifth embodiment of the present disclosure, since there is no resource allocation signaling in the two HE-SIG-B channels, STAs may not be able to determine the number of user-specific subfields per HE-SIG-B channel field $N_{uss}$. Given that the number of HE-SIG-B symbols $N_{sym}$, the MCS used for the HE-SIG-B 112, and the value of $\alpha$, the number of user-specific subfields per HE-SIG-B channel field can be determined by

[Math. 16]

$$N_{uss}=N_{blk}\times 2-\alpha \quad (16)$$

where

[Math. 17]

$$N_{blk} = \left\lfloor \frac{N_{sym} \times N_{DBPS} + \alpha \times L_{uss}}{L_{blk}} \right\rfloor. \quad (17)$$

In other words, for the purpose of assisting STAs in determining the number of user-specific subfield per HE-SIG-B channel field $N_{uss}$, a signaling may be required in the HE-SIG-A 110 to indicate the value of $\alpha_i$ (i.e., to indicate whether there is an even number of user-specific subfields per HE-SIG-B channel field or equivalently to indicate whether there is an even number of users scheduled in each of the first 20 MHz subband channel 322 and the second 20 MHz subband channels 324).

Sixth Embodiment

According to a sixth embodiment of the present disclosure, if the entire 40 MHz bandwidth which covers the first 20 MHz subband channel 322 and the second 20 MHz subband channel 324 is allocated for MU-MIMO transmission, each of the two HE-SIG-B channel fields may contain the user-specific field only. Furthermore, the user-specific subfields are split equitably between the two HE-SIG-B channel fields for efficient load-balancing. In more details, for MU-MIMO transmission with K users multiplexed, the first $$N_{uss,1} = \left\lceil \frac{K}{2} \right\rceil$$

user-specific subfields exit in the HE-SIG-B1 302 and the remaining $$N_{uss,2} = K - \left\lceil \frac{K}{2} \right\rceil$$

user-specific subfield exist in the HE-SIG-B2 304. Consequently, the number of HE-SIG-B symbols is minimized and thus overhead for reporting control signaling is reduced and channel efficiency is improved.

FIG. 11 illustrates an example format of the HE-SIG-B 112 of the HE packet 100 in case of CBW=40 MHz according to the sixth embodiment of the present disclosure. In this example, the entire 40 MHz bandwidth which covers both the first 20 MHz subband channel 322 and the second 20 MHz subband channel 324 is allocated for MU-MIMO transmission with seven users multiplexed. So each of the HE-SIG-B1 322 and the HE-SIG-B2 304 only contains the user-specific field 1150. The number of user-specific subfields $N_{uss,1}$ and the number of BCC blocks $N_{blk,1}$ in the HE-SIG-B1 302 is 4 and 2, respectively. The number of user-specific subfields $N_{uss,2}$ and the number of BCC blocks $N_{blk,2}$ in the HE-SIG-B2 304 is 3 and 2, respectively. Assume that each user-specific subfield has a length of $L_{uss}$=22 bits and
each BCC block comprising two user-specific subfields has a length of $L_{blk}$=54 bits; and
the MCS used for the HE-SIG-B 112 is VHT-MCS1 where $N_{DBPS}$=52.

So the number of the HE-SIG-B symbols $N_{sym}$ is 3, which can be calculated by

[Math. 18]

$$N_{sym} = \left\lceil \frac{L_{blk} \times N_{blk,1} - \alpha \times L_{uss}}{N_{DBPS}} \right\rceil. \quad (18)$$

where

[Math. 19]

$$\alpha = \begin{cases} 0, \text{ if } N_{uss,1} \text{ is an even number} \\ 1, \text{ otherwise} \end{cases} \quad (19)$$

According to the sixth embodiment of the present disclosure, in addition to the signaling of indicating the number of HE-SIG-B symbols and the MCS used for the HE-SIG-B 112, a signaling is required in the HE-SIG-A 110 to indicate the presence of a specific resource allocation where the entire channel bandwidth is allocated for MU-MIMO transmission. Based on such signaling, STAs are able to decode the HE-SIG-B 112 properly.

According to the sixth embodiment of the present disclosure, since there is no resource allocation signaling in the two HE-SIG-B channels, STAs may not be able to determine the number of user-specific subfields $N_{uss,1}$ in the HE-SIG- B1 302 and the number of user-specific subfields $N_{uss,2}$ in the HE-SIG-B2 304. Given that the number of HE-SIG-B symbols $N_{sym}$, the MCS used for the HE-SIG-B 112 and the value of $\alpha$, the number of user-specific subfields $N_{uss,1}$ in the HE-SIG-B1 302 can be determined by

[Math. 20]

$$N_{uss,1} = N_{blk,1} \times 2 - \alpha \qquad (20)$$

Where

[Math. 21]

$$N_{blk,1} = \left\lfloor \frac{N_{sym} \times N_{DBPS} + \alpha \times L_{uss}}{L_{blk}} \right\rfloor. \qquad (21)$$

The number of user-specific subfields $N_{uss,2}$ in the HE-SIG-B2 304 can be determined by

[Math. 22]

$$N_{uss,2} = N_{uss,1} - \beta \qquad (22)$$

where

[Math. 23]

$$\beta = \begin{cases} 0, & \text{if } N_{uss,2} = N_{uss,1} \\ 1, & \text{otherwise} \end{cases} \qquad (23)$$

In other words, for the purpose of assisting STAs in determining the number of user-specific subfields $N_{uss,1}$ in the HE-SIG-B1 302 and the number of user-specific subfields $N_{uss,2}$ in the HE-SIG-B2 304, a signaling may be required in the HE-SIG-A 110 to indicate the value of $\alpha$ (i.e., to indicate whether there is an even number of user-specific subfields in the HE-SIG-B1 302) and the value of $\beta$ (i.e., to indicate whether there is equal number of user-specific subfields in both the HE-SIG-B1 302 and the HE-SIG-B2 304). Alternatively, a signaling may be required in the HE-SIG-A 110 to indicate the remainder of the number of users multiplexed in MU-MIMO transmission divided by four. The remainder equal to zero implies $\alpha=0$ and $\beta=0$. The remainder equal to one implies $\alpha=1$ and $\beta=1$. The remainder equal to two implies $\alpha=1$ and $\beta=0$. The remainder equal to three implies $\alpha=0$ and $\beta=1$.

HE-SIG-B related signaling fields in the HE-SIG-A

According to the proposed IEEE 802.11ax draft specification [see NPL 5], the signaling fields in the HE-SIG-A 110 shown in Table 2 provide necessary information about the HE-SIG-B 112.

TABLE 2

HE-SIG-B related signaling fields in the HE-SIG-A according to the proposed IEEE 802.11ax draft specification

| Field | Length (bits) | Description |
|---|---|---|
| SIGB MCS | 3 | Indication the MCS of HE-SIG-B. |
| | | Set to "000" for MCS0 |
| | | Set to "001" for MCS1 |
| | | Set to "010" for MCS2 |
| | | Set to "011" for MCS3 |
| | | Set to "100" for MCS4 |
| | | Set to "101" for MCS5 |
| SIGB DCM | 1 | Set to 1 indicates that the HE-SIG-B is modulated with dual sub-carrier modulation for the MCS. |
| | | Set to 0 indicates that the HE-SIB-B is not modulated with dual sub-carrier modulation for the MCS. |
| SIGB Number Of Symbols | 4 | Indicates the number of HE-SIG-B symbols. |
| SIGB Compression | 1 | Set to 1 for full bandwidth MU-MIMO compressed SIG-B. |
| | | Set to 0 otherwise. |

According to the proposed IEEE 802.11ax specification [see NPL 5], the DCM (Dual sub-Carrier Modulation) is only applicable to MCS0, MCS1, MCS3 and MCS4.

According to the proposed IEEE 802.11ax draft specification [see NPL 5], the number of spatially multiplexed users in a full bandwidth MU-MIMO transmission is up to 8.

According to the proposed IEEE 802.11ax draft specification [see NPL 5], the length in bits of each user-specific subfield in the HE-SIG-B 112 is 21, the length in bits of each BCC block comprising a single user-specific subfield in the HE-SIG-B 112 is 31, and the length in bits of BCC block comprising two user-specific subfields in the HE-SIG-B 112 is 52, which is exactly the same as the number of data sub-carriers per HE-SIG-B symbol.

Seventh Embodiment

The seventh embodiment of the present disclosure employs exactly the same compressed HE-SIG-B structure as the sixth embodiment in case of full bandwidth MU-MIMO transmission. However, the seventh embodiment specifies different signaling support in the HE-SIG-A 110 for compressed HE-SIG-B 112 from the sixth embodiment.

Notice that for the compressed HE-SIG-B 112, as shown in Table 3, the number of HE-SIG-B symbols depends on the MCS used for the HE-SIG-B 112 and the number of spatially multiplexed users in full bandwidth MU-MIMO transmission which is equal to the number of user-specific subfields in the HE-SIG-B 112, $N_{SSS,1}$. It can be observed from Table 3 that the maximum number of HE-SIG-B symbols for the compressed HE-SIG-B 112 is eight. As a result, three bits in the 4-bit SIGB Number of Symbols field in the HE-SIG-A 110 are enough to indicate the number of HE-SIG-B symbols for the compressed HE-SIG-B 112, and thus one remaining bit in the 4-bit SIGB Number of Symbols field in the HE-SIG-A 110 can be used for other purposes. It can also be observed from Table 3 that MCS2, MCS4 and MCS5 may not be necessary for the compressed HE-SIG-B 112. This is because for the same number of spatially multiplexed users in full bandwidth MU-MIMO transmission, MCS4 with DCM applied requires the same number of HE-SIG-B symbols as MCS3 with DCM applied, and MCS4 without DCM applied or MCS5 requires the same number of HE-SIG-B symbols as MCS3 without DCM applied, and MCS2 requires the same number of HE-SIG-B symbols as MCS1 without DCM applied. As a result, two bits in the 3-bit SIGB MCS field in the HE-SIG-A 110 are enough to indicate the MCS used for the compressed HE-SIG-B 112, and thus one remaining bit in the 3-bit SIGB MCS field in the HE-SIG-A 110 can also be used for other purposes.

TABLE 3

Table 3: Number of HE-SIG-B symbols for full bandwidth MU-MIMO compressed HE-SIG-B

| MCS | $N_{DBPS}$ | Number of HE-SIG-B Symbols ($N_{sym}$) | | | | | | |
|---|---|---|---|---|---|---|---|---|
| | | $N_{uss}=2$ | $N_{uss}=3$ | $N_{uss}=4$ | $N_{uss}=5$ | $N_{uss}=6$ | $N_{uss}=7$ | $N_{uss}=8$ |
| 0 (DCM = 0) | 26 | 2 | 2 | 2 | 4 | 4 | 4 | 4 |
| 0 (DCM = 1) | 13 | 3 | 4 | 4 | 7 | 7 | 8 | 8 |
| 1 (DCM = 0) | 52 | 1 | 1 | 1 | 2 | 2 | 2 | 2 |
| 1 (DCM = 1) | 26 | 2 | 2 | 2 | 4 | 4 | 4 | 4 |
| 2 | 78 | 1 | 1 | 1 | 2 | 2 | 2 | 2 |
| 3 (DCM = 0) | 104 | 1 | 1 | 1 | 1 | 1 | 1 | 1 |
| 3 (DCM = 1) | 52 | 1 | 1 | 1 | 2 | 2 | 2 | 2 |
| 4 (DCM = 0) | 156 | 1 | 1 | 1 | 1 | 1 | 1 | 1 |
| 4 (DCM = 1) | 78 | 1 | 1 | 1 | 2 | 2 | 2 | 2 |
| 5 | 208 | 1 | 1 | 1 | 1 | 1 | 1 | 1 |

According to the seventh embodiment of the present disclosure, a 3-bit signaling is carried in the HE-SIG-A 110 to indicate the number of spatially multiplexed users in full bandwidth MU-MIMO transmission when the SIGB Compression field of the HE-SIG-A 110 sets to 1.

In one embodiment, one of the three signaling bits reuses a predetermined bit, e.g., MSB (Most Significant Bit), of the 4-bit SIGB Number of Symbols field in the HE-SIG-A 110. In one embodiment, one of the three signaling bits reuses a predetermined bit, e.g., MSB, of the 3-bit SIGB MCS field in the HE-SIG-A 110. In both cases, only two extra signaling bits are required in the HE-SIG-A 110. It saves one signaling bit compared with signaling the number of spatially multiplexed users in full bandwidth MU-MIMO transmission directly in the HE-SIG-A 110. For example, as shown in Table 4, the MSB of the 4-bit SIGB Number of Symbols field in the HE-SIG-A 110 is reused to indicate whether there is equal number of user-specific subfields in both the HE-SIG-B1 302 and the HE-SIG-B2 304. The two extra signaling bits are used to indicate the number of user-specific subfields in the HE-SIG-B1 302 (i.e., $N_{uss,1}$). The receiver is able to determine the number of spatially multiplexed users in full bandwidth MU-MIMO transmission by

[Math. 24]

$$N_{uss}=2\times N_{uss,1}-\beta \qquad (24)$$

Where $\beta$ is equal to zero if both the HE-SIG-B1 302 and the HE-SIG-B2 304 have the same number of user-specific subfields. Otherwise $\beta$ is equal to one.

TABLE 4

HE-SIG-B related signaling fields in the HE-SIG-A according to the seventh embodiment

| Field | Length (bits) | Description |
|---|---|---|
| SIGB MCS | 3 | Indication the MCS of HE-SIG-B. |
| | | Set to "000" for MCS0 |
| | | Set to "001" for MCS1 |
| | | Set to "010" for MCS2 |
| | | Set to "011" for MCS3 |
| | | Set to "100" for MCS4 |
| | | Set to "101" for MCS5 |
| SIGB DCM | 1 | Set to 1 indicates that the HE-SIG-B is modulated with dual sub-carrier modulation for the MCS. |
| | | Set to 0 indicates that the HE-SIB-B is not modulated with dual sub-carrier modulation for the MCS. |
| SIGB Number Of Symbols | 4 | Indicates the number of HE-SIG-B symbols if SIGB Compression sets to 0. Otherwise the first three bits indicate the number of HE-SIG-B symbols and the MSB indicates whether there is equal number of user-specific sub-fields in both the HE-SIG-B1 and the HE-SIG-B2. |
| SIGB Compression | 1 | Set to 1 for full bandwidth MU-MIMO compressed SIG-B. |
| | | Set to 0 otherwise. |
| SIGB Compression | 2 | Indication the number of user-specific subfields in the HE-SIG-B1. Valid only if SIGB Compression sets to 1. |
| | | Set to "00" one user-specific subfield |
| | | Set to "01" two user-specific subfields |
| | | Set to "10" three user-specific subfields |
| Additional Info | | Set to "11" four user-specific subfields |

In one embodiment, two of the three signaling bits reuses both a predetermined bit, e.g., MSB, of the 4-bit SIGB Number of Symbols field in the HE-SIG-A 110 and a predetermined bit, e.g., MSB, of the 3-bit SIGB MCS field in the HE-SIG-A 110. In this case, only one extra signaling bit is required in the HE-SIG-A 110 to indicate the number of spatially multiplexed users in full bandwidth MU-MIMO transmission. It saves two signaling bit compared with signaling the number of spatially multiplexed users in full bandwidth MU-MIMO transmission directly in the HE-SIG-A 110. For example, the MSB of the 4-bit SIGB Number of Symbols field in the HE-SIG-A 110 is reused to indicate whether there is equal number of user-specific subfields in both the HE-SIG-B1 302 and the HE-SIG-B2 304. The MSB of the 3-bit SIGB MCS field in the HE-SIG-A 110 is reused to indicate whether the number of BCC blocks in the HE-SIG-B1 302, $N_{blk,1}$, is one or two. One extra signaling bit is used to indicate whether the last BCC block in the HE-SIG-B1 302 includes a single user-specific subfield or two user-specific subfields. The receiver is able to determine the number of spatially multiplexed users in full bandwidth MU-MIMO transmission by

[Math. 25]

$$N_{uss} = 2 \times (2 \times N_{blk,1} - \alpha) - \beta \quad (25)$$

where $\alpha$ is equal to zero if the last BCC block in the HE-SIG-B1 302 includes two user-specific subfields. Otherwise $\alpha$ is equal to one. $\beta$ is equal to zero if both the HE-SIG-B1 302 and the HE-SIG-B2 304 have the same number of user-specific subfields. Otherwise $\beta$ is equal to one.

Eighth Embodiment

The eighth embodiment of the present disclosure employs the exactly same compressed HE-SIG-B structure as the sixth embodiment in case of full bandwidth MU-MIMO transmission. However, the eighth embodiment specifies different signaling support in the HE-SIG-A 110 for compressed HE-SIG-B 112 from the sixth embodiment.

According to the eighth embodiment of the present disclosure, the length in bits of the SIGB Compression field in the HE-SIG-A 110 is extended from 1 bit to 3 bits to jointly indicate the HE-SIG-B mode (i.e., whether the HE-SIG-B 112 is compressed or not) and the number of spatially multiplexed users in full bandwidth MU-MIMO transmission. An example signaling encoding is shown in Table 5. As a result, only two extra signaling bits are required in the HE-SIG-A 110 to indicate the number of spatially multiplexed users in full bandwidth MU-MIMO transmission. It saves one signaling bit compared with signaling the number of spatially multiplexed users in full bandwidth MU-MIMO transmission directly in the HE-SIG-A 110.

TABLE 5

HE-SIG-13 related signaling fields in the HE-SIG-A according to the eighth embodiment

| Field | Length (bits) | Description |
|---|---|---|
| SIGB MCS | 3 | Indication the MCS of HE-SIG-B. |
| | | Set to "000" for MCS0 |
| | | Set to "001" for MCS1 |
| | | Set to "010" for MCS2 |
| | | Set to "011" for MCS3 |
| | | Set to "100" for MCS4 |
| | | Set to "101" for MCS5 |
| SIGB DCM | 1 | Set to 1 indicates that the HE-SIG-B is modulated with dual sub-carrier modulation for the MCS. |
| | | Set to 0 indicates that the HE-SIB-B is not modulated with dual sub-carrier modulation for the MCS. |
| SIGB Number Of Symbols | 4 | Indicates the number of HE-SIG-B symbols |
| SIGB Compression | 3 | Set to "000" for full bandwidth MU-MIMO compressed SIGB with two spatially multiplexed users |
| | | Set to "001" for full bandwidth MU-MIMO compressed SIGB with three spatially multiplexed users |
| | | Set to "010" for full bandwidth MU-MIMO compressed SIGB with four spatially multiplexed users |
| | | Set to "011" for full bandwidth MU-MIMO compressed SIG-B with five spatially multiplexed users |
| | | Set to "100" for full bandwidth MU-MIMO compressed SIG-B with six spatially multiplexed users |
| | | Set to "101" for full bandwidth MU-MIMO compressed SIGB with seven spatially multiplexed users |
| | | Set to "110" for full bandwidth MU-MIMO compressed SIGB with eight spatially multiplexed users |
| | | Set to "111" uncompressed SIG-B |

Ninth Embodiment

The ninth embodiment of the present disclosure employs exactly the same compressed HE-SIG-B structure as the sixth embodiment in case of full bandwidth MU-MIMO transmission. However, the ninth embodiment specifies different signaling support in the HE-SIG-A 110 for compressed HE-SIG-B 112 from the sixth embodiment.

It can be observed from Table 3 that not every combination between the number of HE-SIG-B symbols (i.e., $N_{sym}$) and the number of spatially multiplexed users (i.e., $N_{uss}$) in full bandwidth MU-MIMO transmission is possible. In more details, for $N_{uss}$=2, the possible number of HE-SIG-B symbols is 1, 2 or 3. For $N_{uss}$=3 or 4, the possible number of HE-SIG-B symbols is 1, 2 or 4. For $N_{uss}$==5 or 6, the possible number of HE-SIG-B symbols is 1, 2, 4 or 7. For $N_{uss}$=7 or 8, the possible number of HE-SIG-B symbols is 1, 2, 4 or 8. In summary, there are 25 possible combinations in total between the number of HE-SIG-B symbols and the number of spatially multiplexed users in full bandwidth MU-MIMO transmission. In other words, 5 bits are enough to signal the 25 possible combinations between the number of HE-SIG-B symbols and the number of spatially multiplexed users in full bandwidth MU-MIMO transmission.

According to the ninth embodiment of the present disclosure, the length in bits of the SIGB Number of Symbols field in the HE-SIG-A 110 is extended from 4 bit to 5 bits to jointly signal the number of HE-SIG-B symbols and the number of spatially multiplexed users in full bandwidth MU-MIMO transmission when the SIGB Compression field in the HE-SIG-A 110 sets to 1. An example signaling encoding is shown in Table 6. As a result, only one extra signaling bit is required in the HE-SIG-A 110 to indicate the number of spatially multiplexed users in full bandwidth MU-MIMO transmission. It saves two signaling bits compared with signaling the number of spatially multiplexed users in full bandwidth MU-MIMO transmission directly in the HE-SIG-A 110.

TABLE 6

HE-SIG-B related signaling fields in the HE-SIG-A according to the ninth embodiment

| Field | Length (bits) | Description |
|---|---|---|
| SIGB MCS | 3 | Indication the MCS of HE-SIG-B.<br>Set to "000" for MCS0<br>Set to "001" for MCS1<br>Set to "010" for MCS2<br>Set to "011" for MCS3<br>Set to "100" for MCS4<br>Set to "101" for MCS5 |
| SIGB DCM | 1 | Set to 1 indicates that the HE-SIG-B is modulated with dual sub-carrier modulation for the MCS.<br>Set to 0 indicates that the HE-SIB-B is not modulated with dual sub-carrier modulation for the MCS. |
| SIGB Number Of Symbols | 5 | Indicates the number of HE-SIG-B symbols if SIGB Compression sets to 0; Otherwise jointly indicates the number of HE-SIG-B symbols and the number of spatially multiplexed users in full bandwidth MU-MIMO transmission.<br>Set to "00000" for 1 HE-SIG-B symbol and 2 spatially multiplexed users<br>Set to "00001" for 1 HE-SIG-B symbol and 3 spatially multiplexed users<br>Set to "00010" for 1 HE-SIG-B symbol and 4 spatially multiplexed users<br>Set to "00011" for 1 HE-SIG-B symbol and 5 spatially multiplexed users<br>Set to "00100" for 1 HE-SIG-B symbol and 6 spatially multiplexed users<br>Set to "00101" for 1 HE-SIG-B symbol and 7 spatially multiplexed users<br>Set to "00110" for 1 HE-SIG-B symbol and 8 spatially multiplexed users<br>Set to "00111" for 2 HE-SIG-B symbols and 2 spatially multiplexed users<br>Set to "01000" for 2 HE-SIG-B symbols and 3 spatially multiplexed users<br>Set to "01001" for 2 HE-SIG-B symbols and 4 spatially multiplexed users<br>Set to "01010" for 2 HE-SIG-B symbols and 5 spatially multiplexed users<br>Set to "01011" for 2 HE-SIG-B symbols and 6 spatially multiplexed users<br>Set to "01100" for 2 HE-SIG-B symbols and 7 spatially multiplexed users<br>Set to "01101" for 2 HE-SIG-B symbols and 8 spatially multiplexed users<br>Set to "01110" for 3 HE-SIG-B symbols and 2 spatially multiplexed users<br>Set to "01111" for 4 HE-SIG-B symbols and 3 spatially multiplexed users<br>Set to "10000" for 4 HE-SIG-B symbols and 4 spatially multiplexed users |

TABLE 6-continued

HE-SIG-B related signaling fields in the HE-SIG-A according to the ninth embodiment

| Field | Length (bits) | Description |
|---|---|---|
| | | Set to "10001" for 4 HE-SIG-B symbols and 5 spatially multiplexed users |
| | | Set to "10010" for 4 HE-SIG-B symbols and 6 spatially multiplexed users |
| | | Set to "10011" for 4 HE-SIG-B symbols and 7 spatially multiplexed users |
| | | Set to "10100" for 4 HE-SIG-B symbols and 8 spatially multiplexed users |
| | | Set to "10101" for 7 HE-SIG-B symbols and 5 spatially multiplexed users |
| | | Set to "10110" for 7 HE-SIG-B symbols and 6 spatially multiplexed users |
| | | Set to "10111" for 8 HE-SIG-B symbols and 7 spatially multiplexed users |
| | | Set to "11000" for 8 HE-SIG-B symbols and 8 spatially multiplexed users |
| SIGS Compression | 1 | Set to 1 for full bandwidth MU-MIMO compressed SIG-B. Set to 0 otherwise. |

Tenth Embodiment

The tenth embodiment of the present disclosure employs the exactly same compressed HE-SIG-B structure as the sixth embodiment in case of full bandwidth MU-MIMO transmission. However, the tenth embodiment specifies different signaling support in the HE-SIG-A 110 for compressed HE-SIG-B 112 from the sixth embodiment.

It can be observed from Table 3 that since MCS2, MCS4 and MCS5 may not be necessary for the compressed HE-SIG-B 112, the total number of combinations among the applicability of DCM to the HE-SIG-B 112, the MCS of the HE-SIG-B 112, the number of HE-SIG-B symbols and the number of spatially multiplexed users in full bandwidth MU-MIMO transmission is 42. In other words, for the compressed HE-SIG-B 112, 6 bits are enough to indicate the applicability of DCM to the HE-SIG-B 112, the MCS of the HE-SIG-B 112, the number of HE-SIG-B symbols and the number of spatially multiplexed users in full bandwidth MU-MIMO transmission.

According to the tenth embodiment of the present disclosure, the applicability of DCM to the HE-SIG-B 112, the MCS of HE-SIG-B 112, the number of HE-SIG-B symbols and the number of spatially multiplexed users in full bandwidth MU-MIMO transmission are jointly indicated using a 8-bit signaling in the HE-SIG-A 110. When the SIGB Compression field in the HE-SIG-A 110 sets to 0, the first three bits of the 8-bit signaling are used to indicate the MCS of the HE-SIG-B 12, the following one bit of the 8-bit signaling is used to indicate whether the DCM is applied to the HE-SIG-B 112 and the last four bits of the 8-bit signaling are used to indicate the number of HE-SIG-B symbols, as shown in Table 2. When the SIGB Compression field in the HE-SIG-A 110 sets to 1, the 8-bit signaling is used to jointly indicate the applicability of DCM to the HE-SIG-B 112, the MCS of the HE-SIG-B 112, the number of HE-SIG-B symbols and the number of spatially multiplexed users in full bandwidth MU-MIMO transmission. In this case, no extra signaling bits are required in the HE-SIG-A 110 to indicate the number of spatially multiplexed users in full bandwidth MU-MIMO transmission.

According to the present disclosure, for the full bandwidth MU-MIMO compressed HE-SIG-B 112, to take advantage of a limited number of spatially multiplexed users in full bandwidth MU-MIMO transmission (i.e., up to eight) and the user-specific subfields are equitably distributed between the HE-SIG-B1 302 and the HE-SIG-B2 304, one or more of the HE-SIG-B related signaling such as the HE-SIG-B mode, the applicability of DCM to the HE-SIG-B 112, the MCS of the HE-SIG-B 112 and the number of HE-SIG-B symbols can be jointly signaled with the number of spatially multiplexed users in the full bandwidth MU-MIMO transmission for the purpose of reducing the extra signaling bits required for indicating the number of spatially multiplexed users in the full bandwidth MU-MIMO transmission for the compressed HE-SIG-B 112.

Eleventh Embodiment

The eleventh embodiment of the present disclosure employs the exactly same compressed HE-SIG-B structure as the sixth embodiment in case of full bandwidth MU-MIMO transmission. However, the eleventh embodiment specifies different signaling support in the HE-SIG-A 110 for compressed HE-SIG-B 112 from the sixth embodiment.

According to the eleventh embodiment of the present disclosure, the SIGB Number of Symbols field in the HE-SIG-A 110 is used to signal the number of spatially multiplexed users in full bandwidth MU-MIMO transmission instead of the number of HE-SIG-B symbols when the SIGB Compression field in the HE-SIG-A 110 sets to 1. An example signaling encoding is shown in Table 7. As a result, no extra signaling bit is required in the HE-SIG-A 110 to indicate the number of spatially multiplexed users in full bandwidth MU-MIMO transmission. It saves three signaling bits compared with signaling the number of spatially multiplexed users in full bandwidth MU-MIMO transmission directly in the HE-SIG-A 110.

TABLE 7

HE-SIG-B related signaling fields in the HE-SIG-A according to the eleventh embodiment

| Field | Length (bits) | Description |
|---|---|---|
| SIGB MCS | 3 | Indication the MCS of HE-SIG-B.<br>Set to "000" for MCS0<br>Set to "001" for MCS1<br>Set to "010" for MCS2<br>Set to "011" for MCS3<br>Set to "100" for MCS4<br>Set to "101" for MCS5 |
| SIGB DCM | 1 | Set to 1 indicates that the HE-SIG-B is modulated with dual sub-carrier modulation for the MCS.<br>Set to 0 indicates that the HE-SIB-B is not modulated with dual sub-carrier modulation for the MCS. |
| SIGB Number Of Symbols | 4 | Indicates the number of HE-SIG-B symbols if SIGB Compression sets to 0; Otherwise indicates the number of spatially multiplexed users in fall bandwidth MU-MIMO transmission.<br>Set to "0000" for 2 spatially multiplexed users<br>Set to "0001" for 3 spatially multiplexed users<br>Set to "0010" for 4 spatially multiplexed users<br>Set to "0011" for 5 spatially multiplexed users<br>Set to "0100" for 6 spatially multiplexed users<br>Set to "0101" for 7 spatially multiplexed users<br>Set to "0110" for 8 spatially multiplexed users |
| SIGB Compression | 1 | Set to 1 for fall bandwidth MU-MIMO compressed SIG-B.<br>Set to 0 otherwise. |

According to the eleventh embodiment of the present disclosure, when the SIGB Compression field in the HE-SIG-A 110 sets to 1, the number of HE-SIG-B symbols can be calculated according to the values of the SIGB MCS field, the SIGB DCM field and the SIGB Number of Symbols field in the HE-SIG-A 110, as shown in Table 3.

HE-SIG-A Signaling Fields and HE-SIG-B Signaling Fields

According to the IEEE 802.11ax specification framework document [see NPL6], in addition to the HE-SIG-B related signaling fields as illustrated in Table 7, the HE-SIG-A 110 comprises a UL/DL field, which indicates whether the HE packet is intended for DL or UL.

According to the IEEE 802.11ax specification framework document [see NPL6], the common block field in HE-SIG-B contains one or more 8-bit RU allocation signaling subfields, each indicating RU allocation information per 20 MHz packet bandwidth such as the RU arrangement in frequency domain, the RU allocated for MU-MIMO and the number of users in MU-MIMO allocations, as illustrated in Table 8. For example, the RU allocation index "00101000" indicates a specific RU arrangement in frequency domain including five RUs allocated for SU-MIMO transmission:
- the first 26-tone RU (i.e., Type I RU)
- the second 26-tone RU (i.e., Type I RU)
- the 52-tone RU (i.e., Type II RU) covering the third and fourth 26-tone RUs.
- the fifth 26-tone RU (i.e., Type I RU)
- the 106-tone RU (i.e., Type III RU) covering the sixth, seventh, eighth and ninth 26-tone RUs

TABLE 8

Table 8: RU allocation signaling subfield according to the IEEE 802.11ax specification framework document

| 8 bits indices | #1 | #2 | #3 | #4 | #5 | #6 | #7 | #8 | #9 | Num of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | | 52 | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | | 26 | 26 | | 1 |
| 00000111 | 26 | 26 | 52 | 26 | 52 | | 52 | | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | 26 | 26 | | 1 |
| 00001011 | 52 | | 26 | 26 | 26 | 52 | | 52 | | 1 |
| 00001100 | 52 | | 52 | 26 | 26 | 26 | 26 | 26 | | 1 |
| 00001101 | 52 | | 52 | 26 | 26 | 26 | 52 | | | 1 |
| 00001110 | 52 | | 52 | 26 | 52 | | 26 | 26 | | 1 |
| 00001111 | 52 | | 52 | 26 | 52 | | 52 | | | 1 |
| 00010yyy | 52 | | 52 | — | | 106 | | | | 8 |
| 00011yyy | | 106 | | — | 52 | | 52 | | | 8 |
| 00100yyy | 26 | 26 | 26 | 26 | 26 | | 106 | | | 8 |
| 00101yyy | 26 | 26 | 52 | | 26 | | 106 | | | 8 |
| 00110yyy | 52 | | 26 | 26 | 26 | | 106 | | | 8 |
| 00111yyy | 52 | | 52 | | 26 | | 106 | | | 8 |
| 01000yyy | | 106 | | | 26 | 26 | 26 | 26 | 26 | 8 |
| 01001yyy | | 106 | | | 26 | 26 | 26 | 52 | | 8 |
| 01010yyy | | 106 | | | 26 | 52 | | 26 | 26 | 8 |
| 01011yyy | | 106 | | | 26 | 52 | | 52 | | 8 |
| 0110zzzz | | 106 | | | — | | 106 | | | 16 |
| 01110000 | 52 | | 52 | — | 52 | | 52 | | | 1 |
| 01110001 | | | | 242-tone RU empty | | | | | | 1 |
| 01110010 | | | | 484-tone RU empty | | | | | | 1 |
| 01110011 | | | | 996-tone RU empty | | | | | | 1 |
| 011101xx | | | | Definition TBD | | | | | | 4 |
| 01111xxx | | | | Definition TBD | | | | | | 8 |
| 10yyyyyy | | 106 | | | 26 | | 106 | | | 64 |
| 11000yyy | | | | 242 | | | | | | 8 |
| 11001yyy | | | | 484 | | | | | | 8 |
| 11010yyy | | | | 996 | | | | | | 8 |
| 11011yyy | | | | 2 * 996 | | | | | | 8 |
| 111xxxxx | | | | Definition TBD | | | | | | 32 |

Note:
'yyy' = 000~111 indicates number of MU-MIMO STAs up to 8; 'zz' = 00~11 indicates number of MU-MIMO STAs for 106-tone RU up to 4.

According to the present disclosure, in addition to DL MU transmission, the HE packet may also be used for DL or UL SU partial band transmission. FIG. 14 illustrates an example format of the HE packet used for SU partial band transmission according to the present disclosure. In terms of SU partial band transmission, the pre-HE-STF portion of the HE packet, which includes the L-STF 102, L-LTF 104, L-SIG 106, RL-SIG 108, HE-SIG-A 110 and HE-SIG-B 112 is transmitted over 20 MHz bandwidth while the HE-STF 114, HE-LTF 116 and HE Data field 120 are transmitted within a single 26-tone RU, 52-tone RU or 106-tone RU, which has a bandwidth of less than 20 MHz. If SU partial band transmission using the HE packet in FIG. 14 is not in a primary 20 MHz channel, additional transmission rules may be required for protecting such SU partial band transmission since carrier sensing may not be performed in a non-primary 20 MHz channel. For example, SU partial band transmission using the HE packet which is not in the primary channel are accompanied with preceding RTS/CTS message exchange.

Twelfth Embodiment

According to the twelfth embodiment of the present disclosure, for DL or UL SU partial band transmission within a single 26-tone RU, 52-tone RU or 106-tone RU, the RU allocation index in the HE-SIG-B 112 of the HE packet in FIG. 14 shall be assigned in such a manner that the number of user-specific subfields in the HE-SIG-B 112 corresponding to the RU arrangement specified by the RU allocation index is as small as possible. As a result, HE-SIG-B overhead is minimized for SU partial band transmission.

Table 9 illustrates how a RU allocation index is assigned when a single 26-tone RU, 52-tone RU or 106-tone RU is allocated for SU partial band transmission according to the twelfth embodiment of the present disclosure. For example, for SU partial band transmission within the first or second 26-tone RU, the RU allocation index should be set to "00101000" since only five user-specific subfields are required, which is the smallest among all the possible RU arrangements. Similarly, for SU partial band transmission within the fifth 26-tone RU, the RU allocation index should be set to "10000000" since only three user-specific subfields are required, which is the smallest among all the possible RU arrangements.

TABLE 9

RU allocation index assignment for RU allocated for SU partial band transmission according to the twelfth embodiment of the present disclosure

| RU allocated for SU partial band transmission | RU allocation index assigned | Num. of required user-specific subfields |
|---|---|---|
| The first or second 26-tone RU | 00101000 | 5 |
| The third or fourth 26-tone RU | 00110000 | |
| The sixth or seventh 26-tone RU | 01001000 | |
| The eighth or ninth 26-tone RU | 01010000 | |
| The fifth 26-tone RU | 10000000 | 3 |
| The first 52-tone RU covering the first and second 26-tone RUs or the second 52-tone RU covering the third and fourth 26-tone RUs | 00010000 | |
| The third 52-tone RU covering the sixth and seventh 26-tone RUs or the fourth 52-tone RU covering the eighth and ninth 26-tone RUs | 00011000 | |
| The first 106-tone RU covering the first, second, third and fourth 26-tone RUs or the second 106-tone RU covering the sixth, seventh, eighth and ninth 26-tone RUs | 01100000 | 2 |

FIG. 15 illustrates an example format of the HE-SIG-B 112 of the HE packet in FIG. 14 used for the SU partial band transmission within the first 26-tone RU according to the twelfth embodiment of the present disclosure. In this case, the RU allocation index is set to "00101000" and only the first user-specific subfield is meaningful while the other four user-specific subfields are dummy with an AID (i.e., STA identifier)=2046. Table 10 illustrates the number of HE-SIG-B symbols for the HE packet in FIG. 14, which is used for the SU partial band transmission within the first 26-tone RU according to the twelfth embodiment of the present disclosure.

TABLE 10

Number of HE-SIG-B symbols for the HE packet used for SU partial band transmission within the first 26-tone RU according to the twelfth embodiment of the present disclosure

| MCS index | NDBPS | Number of SIG-B symbols (Nsym) |
|---|---|---|
| 0 (DCM = 0) | 26 | 6 |
| 0 (DCM = 1) | 13 | 12 |
| 1 (DCM = 0) | 52 | 3 |
| 1 (DCM = 1) | 26 | 6 |
| 2 | 78 | 2 |
| 3 (DCM = 0) | 104 | 2 |
| 3 (DCM = 1) | 52 | 3 |
| 4 (DCM = 0) | 156 | 1 |
| 4 (DCM = 1) | 78 | 2 |
| 5 | 208 | 1 |

Thirteenth Embodiment

According to the thirteenth embodiment of the present disclosure, each of fifteen reserved entries in the RU allocation signaling table as illustrated in Table 8 is used to indicate a specific 26-tone RU, 52-tone RU or 106-tone RU allocated for SU partial band transmission.

Table 11 illustrates RU allocation signaling in the HE-SIG-B 112 of the HE packet 100 according to the thirteen embodiment of the present disclosure. In particular, the RU allocation index 11100000 to 11101110 is used to indicate a specific 26-tone RU, 52-tone RU or 106-tone RU allocated for SU partial band transmission. For example, the RU allocation index "11100000" is used to indicate the first 26-tone RU allocated for SU partial band transmission, and the RU allocation index "11101001" is used to indicate the first 52-tone RU covering the first and second 26-tone RUs allocated for SU partial band transmission.

According to the thirteenth embodiment of the present disclosure, as illustrated in Table 11 the 8-bit RU allocation signaling subfield in the HE-SIG-B 112 is able to specify not only two or more 26-tone RUs, 52-tone RUs and/or 106-tone RUs, but also a single 26-tone RU, 52-tone RU or 106-tone RU.

TABLE 11

Table 11: RU allocation signaling subfield in the HE-SIG-B of the HE packet according to the thirteenth embodiment of the present disclosure

| 8 bits indices | #1 | #2 | #3 | #4 | #5 | #6 | #7 | #8 | #9 | Num of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010yyy | 52 | | 52 | | — | | 106 | | | 8 |
| 00011yyy | | 106 | | | — | | 52 | | 52 | 8 |
| 00100yyy | 26 | 26 | 26 | 26 | 26 | | 106 | | | 8 |
| 00101yyy | 26 | 26 | 52 | | 26 | | 106 | | | 8 |
| 00110yyy | 52 | | 26 | 26 | 26 | | 106 | | | 8 |
| 00111yyy | 52 | | 52 | | 26 | | 106 | | | 8 |
| 01000yyy | | 106 | | | 26 | 26 | 26 | 26 | 26 | 8 |
| 01001yyy | | 106 | | | 26 | 26 | 26 | 52 | | 8 |
| 01010yyy | | 106 | | | 26 | 52 | | 26 | 26 | 8 |
| 01011yyy | | 106 | | | 26 | 52 | | 52 | | 8 |
| 0110zzzz | | 106 | | | | | 106 | | | 16 |
| 01110000 | 52 | | 52 | | — | | 52 | | 52 | 1 |
| 01110001 | | | | 242-tone RU empty | | | | | | 1 |
| 01110010 | | | | 484-tone RU empty | | | | | | 1 |
| 01110011 | | | | 996-tone RU empty | | | | | | 1 |
| 011101xx | | | | Definition TBD | | | | | | 4 |
| 01111xxx | | | | Definition TBD | | | | | | 8 |
| 10yyyyyy | | 106 | | | 26 | | 106 | | | 64 |
| 11000yyy | | | | 242 | | | | | | 8 |
| 11001yyy | | | | 484 | | | | | | 8 |
| 11010yyy | | | | 996 | | | | | | 8 |
| 11011yyy | | | | 2 * 996 | | | | | | 8 |
| 11100000 | 26 | — | — | — | — | — | — | — | — | 1 |
| 11100001 | — | 26 | — | — | — | — | — | — | — | 1 |
| 11100010 | — | — | 26 | — | — | — | — | — | — | 1 |
| 11100011 | — | — | — | 26 | — | — | — | — | — | 1 |
| 11100100 | — | — | — | — | 26 | — | — | — | — | 1 |
| 11100101 | — | — | — | — | — | 26 | — | — | — | 1 |
| 11100110 | — | — | — | — | — | — | 26 | — | — | 1 |
| 11100111 | — | — | — | — | — | — | — | 26 | — | 1 |
| 11101000 | — | — | — | — | — | — | — | — | 26 | 1 |
| 11101001 | 52 | | — | | — | | — | | — | 1 |
| 11101010 | — | | 52 | | — | | — | | — | 1 |
| 11101011 | — | | — | | 52 | | — | | — | 1 |
| 11101100 | — | | — | | — | | 52 | | — | 1 |
| 11101101 | | 106 | | | — | | | | — | 1 |
| 11101110 | — | | | | — | | | 106 | | 1 |
| 11101111 | | | | Definition TBD | | | | | | 1 |
| 1111xxxx | | | | Definition TBD | | | | | | 16 |

FIG. 16 illustrates an example format of the HE-SIG-B 112 of the HE packet of FIG. 14, which is used for SU partial band transmission within the first 26-tone RU according to the thirteenth embodiment of the present disclosure. Since the 8-bit RU allocation signaling subfield in the HE-SIG-B 112 as illustrated in Table 11 is able to indicate a specific 26-tone RU, 52-tone RU or 106-tone RU, only a single user-specific subfield is required in the HE-SIG-B 112 and no dummy user-specific subfields exist in the HE-SIG-B 112. Table 12 illustrates the number of HE-SIG-B symbols for the HE packet 100 used for SU partial band transmission within the first 26-tone RU according to the thirteen embodiment of the present disclosure. Compared with the twelfth embodiment, HE-SIG-B overhead of the thirteenth embodiment is reduced significantly especially when MCS0, MCS1, MCS2 or MCS3 is applied to the HE-SIG-B 112.

TABLE 12

Number of HE-SIG-B symbols for the HE packet used for SU partial band transmission within the first 26-tone RU according to the thirteenth embodiment of the present disclosure

| MCS index | NDBPS | Number of SIG-B symbols (Nsym) |
|---|---|---|
| 0 (DCM = 0) | 26 | 2 |
| 0 (DCM = 1) | 13 | 4 |
| 1 (DCM = 0) | 52 | 1 |
| 1 (DCM = 1) | 26 | 2 |
| 2 | 78 | 1 |
| 3 (DCM = 0) | 104 | 1 |
| 3 (DCM = 1) | 52 | 1 |
| 4 (DCM = 0) | 156 | 1 |
| 4 (DCM = 1) | 78 | 1 |
| 5 | 208 | 1 |

Fourteenth Embodiment

According to the fourteenth embodiment of the present disclosure, for SU partial band transmission, the RU allocation signaling in the HE-SIG-B 112 of the HE packet in FIG. 14 is used to indicate a single 26-tone RU, 52-tone RU or 106-tone RU instead of an RU arrangement comprising two or more 26-tone RUs, 52-tone RUs and/or 106-tone RUs. As a result, similar to the thirteenth embodiment of the present disclosure, only a single user-specific subfield is required in the HE-SIG-B 112. As illustrated in Table 12, compared with the twelfth embodiment, overhead in the HE-SIG-B field of the fourteenth embodiment is reduced significantly especially when MCS0, MCS1, MCS2 or MCS3 is applied to the HE-SIG-B 112.

According to the fourteenth embodiment of the present disclosure, the existing 8-bit RU allocation signaling subfield in the Per User Info field of the Trigger frame (see NPL 6) can be used to indicate a single 26-tone RU, 52-tone RU or 106-tone RU. The first bit of the 8-bit RU allocation signaling indicates the allocated RU is located in the primary or non-primary 80 MHz channel. The mapping of the subsequent 7-bit RU allocation indices to the allocated RU is illustrated in Table 13. For example, the RU allocation index "00000000" indicates the first 26-tone RU of the primary 80 MHz channel is allocated for SU partial band transmission.

TABLE 13

RU allocation signaling in the HE-SIG-B of the HE packet used for SU partial bandtransmission according to the fourteenth embodiment of the present disclosure

| 7 bits indices | Message | Number of entries |
|---|---|---|
| 0000000~0100100 | Possible 26 RU cases in 80 MHz | 37 |
| 0100101~0110100 | Possible 52 RU cases in 80 MHz | 16 |
| 0110101~0111100 | Possible 106 RU cases in 80 MHz | 8 |
| Total | | 61 |

Notice that Trigger-based UL MU transmission is an optional feature in IEEE 802.11ax (see NPL 6). If a STA intends to implement Trigger-based UL MU transmission, using the 8-bit RU allocation signaling in the Per User Info field of the Trigger frame does not incur extra implementation complexity. However, if a STA intends not to implement Trigger-based UL MU transmission, using the 8-bit RU allocation signaling in the Per User Info field of the Trigger frame incurs extra implementation complexity.

According to the fourteenth embodiment of the present disclosure, an alternative 4-bit RU allocation signaling can be used to indicate a single 26-tone RU, 52-tone RU or 106-tone RU. The mapping of the 4-bit RU allocation indices to the RU allocation is defined in Table 14. For example, the RU allocation index "0000" indicates the first 26-tone RU in the 20 MHz is allocated for SU partial band transmission.

TABLE 14

Alternative RU allocation signaling subfield in the HE-SIG-B of the HE packet used for SU partial band transmission according to the fourteenth embodiment of the present disclosure

| 4 bits indices | Message | Number of entries |
|---|---|---|
| 0000~1000 | Possible 26-tone RU cases in 20 MHz | 9 |
| 1001~1100 | Possible 52-tone RU cases in 20 MHz | 4 |
| 1101~1110 | Possible 106-tone RU cases in 20 MHz | 2 |
| Total | | 15 |

If a STA intends not to implement Trigger-based UL MU transmission, the alternative 4-bit RU allocation signaling subfield illustrated in Table 14 has a lower implementation complexity than the 8-bit RU allocation signaling as illustrated in Table 13 since the former requires a smaller look-up table than the latter.

According to the fourteenth embodiment of the present disclosure, when a transmitting STA is going to engage in SU partial band transmission within a single 26-tone RU, 52-tone RU or 106-tone RU with a receiving STA using the HE packet, the transmitting STA can determine whether the 8-bit RU allocation signaling as illustrated in Table 13 or the alternative 4-bit RU allocation signaling subfield as illustrated in Table 14 is used in the HE-SIG-B 112 of the HE packet based on the capability of the receiving STA. If the receiving STA supports Trigger-based UL MU transmission, the transmitting STA uses the 8-bit RU allocation signaling as illustrated in Table 13. Otherwise the transmitting STA uses the alternative 4-bit RU allocation signaling subfield as illustrated in Table 14. As a result, implementation complexity is minimized.

According to the fourteenth embodiment of the present disclosure, if a transmitting STA is going to engage SU partial band transmission within a single 26-tone RU, 52-tone RU or 106-tone RU with a receiving STA using the HE packet, the 8-bit RU allocation signaling subfield as illustrated in Table 13 or the alternative 4-bit RU allocation signaling subfield g as illustrated in Table 14 is used in the HE-SIG-B 112 of the HE packet. Otherwise the 8-bit RU allocation signaling subfield as illustrated in Table 8 may be used. As a result, additional signaling support in the HE-SIG-A 110 of the HE packet is necessary in order for the receiving STA to know which RU allocation signaling subfield is used in the HE-SIG-B 112 of the HE packet.

Table 15 illustrates HE-SIG-B related signaling fields in the HE-SIG-A 110 of the HE packet according to the fourteenth embodiment of the present disclosure. The SIGB Compression field in the HE-SIG-A is reused to indicate whether HE-SIG-B compression is enabled. If HE-SIG-B compression is enabled, the last bit of the SIGB Number Of Symbols field in the HE-SIG-A 110 is used to indicate whether HE-SIG-B compression for full-bandwidth MU-MIMO or HE-SIG-B compression for SU partial band transmission is enabled. If both the SIGB Compression field and the SIGB Number Of Symbols field in the HE-SIG-A 110 indicate that HE-SIG-B compression for SU partial band transmission is enabled, the 8-bit RU allocation signaling subfield as illustrated in Table 13 or the alternative 4-bit RU allocation signaling subfield as illustrated in Table 14 is used in the HE-SIG-B 112. If both the SIGB Compression field and the SIGB Number Of Symbols field in the HE-SIG-A 110 indicate that HE-SIG-B compression for full bandwidth MU-MIMO is enabled, there is no RU allocation signaling subfield in the HE-SIG-B 112 according to the sixth to eleventh embodiments of the present disclosure. Otherwise the 8-bit RU allocation signaling as illustrated in Table 8 is used in the HE-SIG-B 112. As a result, the receiving STA is able to know which RU allocation signaling is used in the HE-SIG-B 112 of the HE packet based on the SIGB Number Of Symbols field and the SIGB Compression field of the HE-SIG-A 110 of the HE packet. Furthermore, compared with the HE-SIG-B related signaling fields in the HE-SIG-A as illustrated in Table 7 according to the eleventh embodiment of the present disclosure, no extra HE-SIG-A signaling bits are required for the fourteenth embodiment of the present disclosure.

TABLE 15

HE-SIG-B related signaling fields in the HE-SIG-A according to the fourteen embodiment of the present disclosure

| Field | Number of Bits | Description |
|---|---|---|
| SIGB MCS | 3 | Indicates the MCS of the HE-SIG-B field: Set to 0 for MCS 0 Set to 1 for MCS 1 Set to 2 for MCS 2 Set to 3 for MCS 3 Set to 4 for MCS 4 Set to 5 for MCS 5 The values 6 and 7 are reserved |
| SIGB DCM | 1 | Set to 1 indicates that the HE-SIG-B is modulated with dual sub-carrier modulation for the MCS. Set to 0 indicates that the HE-SIB-B is not modulated with dual sub-carrier modulation for the MCS. |
| SIGS Number Of Symbols | 4 | If the SIGB Compression field is 0, indicates the number of OFDM symbols in the HE-SIG-B field minus 1. If the SIGB Compression field is 1, the first 3 bits indicates the number of MU-MIMO users and the last bit sets to 1 for HE-SIG-B compression for full-bandwidth MU-MIMO and sets to 0 for HE-SIG-B compression for SU partial band transmission. Notice that for SU partial band transmission, the number of MU-MIMO users is 1. |
| SIGB Compression | 1 | Set to 1 when SIGB Compression is enabled. Set to 0 otherwise. |

Table 16 illustrates HE-SIG-B related signaling fields in the HE-SIG-A 110 of the HE packet according to the fourteenth embodiment of the present disclosure in case that only UL SU partial band transmission is supported. The SIGB Compression field in the HE-SIG-A 110, together with the UL/DL field in the HE-SIG-A 110, is used to indicate whether HE-SIG-B compression for full-bandwidth MU-MIMO or HE-SIG-B compression for SU partial band transmission is enabled. If both the UL/DL field and the SIGB Compression field in the HE-SIG-A 110 indicate that HE-SIG-B compression for SU partial band transmission is enabled, the 8-bit RU allocation signaling as illustrated in Table 13 or the alternative 4-bit RU allocation signaling as illustrated in Table 14 is used in the HE-SIG-B 112. If both the UL/DL field and the SIGB Compression field in the HE-SIG-A 110 indicate that HE-SIG-B compression for full bandwidth MU-MIMO is enabled, there is no RU allocation signaling in the HE-SIG-B 112 according to the sixth to eleventh embodiments of the present disclosure. Otherwise the 8-bit RU allocation signaling as illustrated in Table 8 is used in the HE-SIG-B 112. As a result, the receiving STA is able to know which RU allocation signaling is used in the HE-SIG-B 112 of the HE packet 100 based on the UL/DL field and the SIGB Compression field of the HE-SIG-A 110 of the HE packet 100. Furthermore, compared with the HE-SIG-B related signaling fields in the HE-SIG-A as illustrated in Table 7 according to the eleventh embodiment of the present disclosure, no extra HE-SIG-A signaling bits are required for the fourteenth embodiment of the present disclosure in case that only UL SU partial band transmission is supported.

TABLE 16

HE-SIG-B related signaling fields in the HE-SIG-A according to the fourteen
embodiment of the present disclosure in case that only UL SU partial band transmission
is supported.

| Field | Number of Bits | Description |
| --- | --- | --- |
| SIGB MCS | 3 | Indicates the MCS of the HE-SIG-B field: Set to 0 for MCS 0 Set to 1 for MCS 1 Set to 2 for MCS 2 Set to 3 for MCS 3 Set to 4 for MCS 4 Set to 5 for MCS 5 The values 6 and 7 are reserved |
| SIGB DCM | 1 | Set to 1 indicates that the HE-SIG-B is modulated with dual sub-carrier modulation for the MCS. Set to 0 indicates that the HE-SIB-B is not modulated with dual sub-carrier modulation for the MCS. |
| SIGB Number Of Symbols | 4 | If the SIGB Compression field is 0, indicates the number of OFDM symbols in the HE-SIG-B field minus 1. If the SIGB Compression field is 1, indicates the number of MU-MIMO users. Notice that for UL SU partial band transmission, the number of MU-MIMO users is 1. |
| SIGB Compression | 1 | Set to 1 for HE-SIG-B compression for full BW MU-MIMO if the UL/DL field is 0 and for HE-SIG-B compression for UL SU partial band transmission if the UL/DL field is 1. Set to 0 otherwise. |

Configuration of an Access Point

FIG. 12 is a block diagram illustrating an example configuration of the AP according to the present disclosure. The AP comprises a controller 1202, a scheduler 1204, a message generator 1208, a message processor 1206, a PHY processor 1210 and an antenna 1212. The antenna 1212 can be comprised of one antenna port or a combination of a plurality of antenna ports. The controller 1202 is a MAC protocol controller and controls general MAC protocol operations. For DL transmission, the scheduler 1204 performs frequency scheduling under the control of the controller 1202 based on channel quality indicators (CQIs) from STAs and assigns data for STAs to RUs. The scheduler 1204 also outputs the resource assignment results to the message generator 1208. The message generator 1208 generates corresponding control signaling (i.e., common control information, resource assignment information and per-user allocation information) and data for scheduled STAs, which are formulated by the PHY processor 1210 into the HE packets and transmitted through the antenna 1212. The control signaling can be configured according to the above mentioned embodiments. On the other hand, the message processor 1206 analyzes the received CQIs from STAs through the antenna 1212 under the control of the controller 1202 and provides them to scheduler 1204 and controller 1202. These CQIs are received quality information reported from the STAs. The CQI may also be referred to as "CSI" (Channel State Information).

Configuration of a STA

FIG. 13 is a block diagram illustrating an example configuration of the STA according to the present disclosure. The STA comprises a controller 1302, a message generator 1304, a message processor 1306, a PHY processor 1308 and an antenna 1310. The controller 1302 is a MAC protocol controller and controls general MAC protocol operations. The antenna 1310 can be comprised of one antenna port or a combination of a plurality of antenna ports. For DL transmission, the antenna 1310 receives downlink signal including HE packets, and the message processor 1306 identifies its designated RUs and its specific allocation information from the control signaling included in the received HE packet, and decodes its specific data from the received HE packet at its designated RUs according to its specific allocation information. The control signaling included in the HE packets can be configured according to the above mentioned embodiments. The message processor 1306 estimates channel quality from the received HE packet through the antenna 1310 and provides them to controller 1302. The message generator 1304 generates CQI message, which is formulated by the PHY processor 1308 and transmitted through the antenna 1310.

In the foregoing embodiments, the present disclosure is configured with hardware by way of example, but the disclosure may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

INDUSTRIAL APPLICABILITY

This disclosure can be applied to a method for formatting and transmitting resource assignment information in a wireless communications system.

REFERENCE SIGNS LIST 1202 controller
1204 scheduler
1206 message processor
1208 message generator
1210 PHY processor
1212 antenna
1302 controller
1304 message generator
1306 message processor
1308 PHY processor
1310 antenna

The invention claimed is:

1. A communication apparatus comprising:
  circuitry, which, in operation, generates an uplink (UL) single-user (SU) partial bandwidth transmission packet using a first format that contains a first preamble and a data field, wherein the first preamble includes a high efficiency signaling B (HE-SIG-B) field containing resource unit (RU) allocation information indicating one of a plurality of RU arrangements and includes a plurality of user fields; and
  a transmitter, which, in operation, transmits the UL SU partial bandwidth transmission packet to an access point (AP),
  wherein:
  the one of the plurality of RU arrangements indicates a plurality of RUs which respectively correspond to the plurality of user fields, and one RU of the plurality of RUs is an RU allocated to the AP and other RU(s) of the plurality of RUs are RU(s) unallocated to the AP;
  the first format is also used for a downlink (DL) multi-user (MU) transmission, and a second format that does not include the HE-SIG-B field is used for a UL SU non-partial bandwidth transmission packet; and
  the plurality of RU arrangements indicate different numbers of the plurality of user fields, and the one of the plurality of RU arrangements indicated by the RU allocation information is selected such that a smallest number of the different numbers of the plurality of user fields is selected.

2. The communication apparatus according to claim 1, wherein the first preamble is transmitted in a 20 MHz bandwidth, and the data field is transmitted within the allocated RU that is a 106-tone RU which is a bandwidth less than 20 MHz.

3. The communication apparatus according to claim 1, wherein the circuitry, in operation, sets a dummy association identifier (AID) to a user field corresponding to the unallocated RU(s).

4. The communication apparatus according to claim 3, wherein the plurality of RUs include more than one unallocated RU, and the dummy AID is set to all of the user fields corresponding to the unallocated RUs.

5. The communication apparatus according to claim 1, wherein the RU allocation information is used for a multi-user multiple input multiple output (MIMO) transmission when the first format is used for the DL MU transmission.

6. The communication apparatus according to claim 1, wherein the RU allocation information is used for an orthogonal frequency division multiplexing (OFDM) transmission.

7. A communication method for a communication apparatus, the communication method comprising:
  generating an uplink (UL) single-user (SU) partial bandwidth transmission packet using a first format that contains a first preamble and a data field, wherein the first preamble includes a high efficiency signaling B (HE-SIG-B) field containing resource unit (RU) allocation information indicating one of a plurality of RU arrangements and includes a plurality of user fields; and
  transmitting the UL SU partial bandwidth transmission packet to an access point (AP),
  wherein:
  the one of the plurality of RU arrangements indicates a plurality of RUs which respectively correspond to the plurality of user fields, and one RU of the plurality of RUs is an RU allocated to the AP and other RU(s) of the plurality of RUs are RU(s) unallocated to the AP;
  the first format is also used for a downlink (DL) multi-user (MU) transmission, and a second format that does not include the HE-SIG-B field is used for a UL SU non-partial bandwidth transmission packet; and
  the plurality of RU arrangements indicate different numbers of the plurality of user fields. and the one of the plurality of RU arrangements indicated by the RU allocation information is selected such that a smallest number of the different numbers of the plurality of user fields is selected.

8. The communication method according to claim 7, wherein the first preamble is transmitted in a 20 MHz bandwidth, and the data field is transmitted within the allocated RU that is a 106-tone RU which is a bandwidth less than 20 MHz.

9. The communication method according to claim 7, comprising:
  setting a dummy association identifier (AID) to a user field corresponding to the unallocated RU(s).

10. The communication method according to claim 9, wherein the plurality of RUs include more than one unallocated RU, and the dummy AID is set to all of the user fields corresponding to the unallocated RUs.

11. The communication method according to claim 7, wherein the RU allocation information is used for a multi-user multiple input multiple output (MIMO) transmission when the first format is used for the DL MU transmission.

12. The communication method according to claim 7, wherein the RU allocation information is used for an orthogonal frequency division multiplexing (OFDM) transmission.

* * * * *